United States Patent
Miyanaga

(10) Patent No.: US 9,749,501 B2
(45) Date of Patent: Aug. 29, 2017

(54) COLOR CONVERSION APPARATUS, RECORDING MEDIUM, AND COLOR CONVERSION METHOD FOR ACCURATELY REPRESENTING PRINT COLOR USING DISPLAY COLOR

(71) Applicant: Kyocera Document Solutions Inc., Osaka (JP)

(72) Inventor: Yuka Miyanaga, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 107 days.

(21) Appl. No.: 14/866,829

(22) Filed: Sep. 25, 2015

(65) Prior Publication Data

US 2016/0094758 A1    Mar. 31, 2016

(30) Foreign Application Priority Data

Sep. 26, 2014 (JP) ................................. 2014-196194

(51) Int. Cl.
*G06F 15/00* (2006.01)
*H04N 1/60* (2006.01)

(52) U.S. Cl.
CPC ......... *H04N 1/6019* (2013.01); *H04N 1/6052* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,001,380 B2* | 4/2015 | Oh ........................ | H04N 1/6058 358/1.9 |
| 2005/0253866 A1* | 11/2005 | Kim ........................ | G09G 5/02 345/594 |
| 2005/0273524 A1* | 12/2005 | Aschenbrenner ...... | G06K 15/02 710/5 |
| 2007/0195345 A1* | 8/2007 | Martinez .............. | H04N 1/6011 358/1.9 |

(Continued)

FOREIGN PATENT DOCUMENTS

JP    4732142 B2    4/2011

*Primary Examiner* — John Wallace
(74) *Attorney, Agent, or Firm* — James Judge

(57) ABSTRACT

A color conversion apparatus includes an independent color value converting circuit and a display color value converting circuit. The independent color value converting circuit converts the image color value into an independent color value independent from a device. The display color value converting circuit converts the independent color value converted by the independent color value converting circuit into the display color value. The independent color value converting circuit converts the image color value into the independent color value indicative of the print color by the print device corresponding to the print color value converted from the image color value. The display color value converting circuit converts the independent color value into the display color value based on display-device-property information indicative of a correspondence relationship between the display color value and the independent color value indicative of the display color by the display device corresponding to the display color value.

3 Claims, 29 Drawing Sheets

(56) References Cited

U.S. PATENT DOCUMENTS

| | | | | |
|---|---|---|---|---|
| 2008/0123948 A1* | 5/2008 | De Baer | ................ | H04N 1/603 |
| | | | | 382/167 |
| 2014/0002481 A1* | 1/2014 | Broughton | ............... | G09G 5/02 |
| | | | | 345/591 |

* cited by examiner

| Image Color Value | | | Appearance Number |
|---|---|---|---|
| R | G | B | |
| 0 | 0 | 0 | 55 |
| 0 | 0 | 1 | 11 |
| 0 | 0 | 2 | 0 |
| 0 | 0 | 3 | 5 |
| . | . | . | . |
| . | . | . | . |
| . | . | . | . |
| 255 | 255 | 252 | 23 |
| 255 | 255 | 253 | 0 |
| 255 | 255 | 254 | 0 |
| 255 | 255 | 255 | 58 |

| Image Color Value | | |
|---|---|---|
| R | G | B |
| 0 | 0 | 0 |
| 0 | 0 | 1 |
| 0 | 0 | 3 |
| 0 | 0 | 52 |
| . | . | . |
| . | . | . |
| . | . | . |
| 255 | 253 | 135 |
| 255 | 255 | 252 |
| 255 | 255 | 255 |

| Image Color Value | | | CIELAB Value | | |
|---|---|---|---|---|---|
| R | G | B | L | a | b |
| 0 | 0 | 0 | | | |
| 0 | 0 | 1 | | | |
| 0 | 0 | 3 | | | |
| 0 | 0 | 52 | | | |
| . | . | . | . | . | . |
| . | . | . | . | . | . |
| . | . | . | . | . | . |
| 255 | 253 | 135 | | | |
| 255 | 255 | 252 | | | |
| 255 | 255 | 255 | | | |

FIG. 17

| Image Color Value | | | Print Color Value | | | |
|---|---|---|---|---|---|---|
| R | G | B | C | M | Y | K |
| 0 | 0 | 0 | | | | |
| 0 | 0 | 1 | | | | |
| 0 | 0 | 3 | | | | |
| 0 | 0 | 52 | | | | |
| . | . | . | . | . | . | . |
| . | . | . | . | . | . | . |
| . | . | . | . | . | . | . |
| 255 | 253 | 135 | | | | |
| 255 | 255 | 252 | | | | |
| 255 | 255 | 255 | | | | |

| Image Color Value | | | Print Color Value | | | | CIELAB Value | | |
|---|---|---|---|---|---|---|---|---|---|
| R | G | B | C | M | Y | K | L | a | b |
| 0 | 0 | 0 | | | | | | | |
| 0 | 0 | 1 | | | | | | | |
| 0 | 0 | 3 | | | | | | | |
| 0 | 0 | 52 | | | | | | | |
| . | . | . | . | . | . | . | . | . | . |
| . | . | . | . | . | . | . | . | . | . |
| . | . | . | . | . | . | . | . | . | . |
| 255 | 253 | 135 | | | | | | | |
| 255 | 255 | 252 | | | | | | | |
| 255 | 255 | 255 | | | | | | | |

COLOR CONVERSION APPARATUS, RECORDING MEDIUM, AND COLOR CONVERSION METHOD FOR ACCURATELY REPRESENTING PRINT COLOR USING DISPLAY COLOR

INCORPORATION BY REFERENCE

This application is based upon, and claims the benefit of priority from, corresponding Japanese Patent Application No. 2014-196194 filed in the Japan Patent Office on Sep. 26, 2014, the entire contents of which are incorporated herein by reference.

BACKGROUND

Unless otherwise indicated herein, the description in this section is not prior art to the claims in this application and is not admitted to be prior art by inclusion in this section.

There is known a system that includes: a display device that can display an image and a print device that can print an image.

SUMMARY

A color conversion apparatus according to one aspect of the disclosure simulatively represents a print color by a print device corresponding to a print color value converted from an image color value indicative of a color value included in image data, using a display color by a display device corresponding to a display color value. The color conversion apparatus includes an independent color value converting circuit and a display color value converting circuit. The independent color value converting circuit converts the image color value into an independent color value independent from a device. The display color value converting circuit converts the independent color value converted by the independent color value converting circuit into the display color value. The independent color value converting circuit converts the image color value into the independent color value indicative of the print color by the print device corresponding to the print color value converted from the image color value. The display color value converting circuit converts the independent color value into the display color value based on display-device-property information indicative of a correspondence relationship between the display color value and the independent color value indicative of the display color by the display device corresponding to the display color value.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 10 illustrates exemplary RGB value count information to be treated in the image color value type acquiring process according to the one embodiment.

FIG. 11 illustrates an exemplary data column generated in the image color value type acquiring process according to the one embodiment.

FIG. 16 illustrates the exemplary data column illustrated in FIG. 11, to which CIELAB values are added.

FIG. 17 illustrates the exemplary data column illustrated in FIG. 11, to which CMYK values are added.

FIG. 19 illustrates the exemplary data column illustrated in FIG. 17, to which CIELAB values are added.

DETAILED DESCRIPTION

Figure 1:
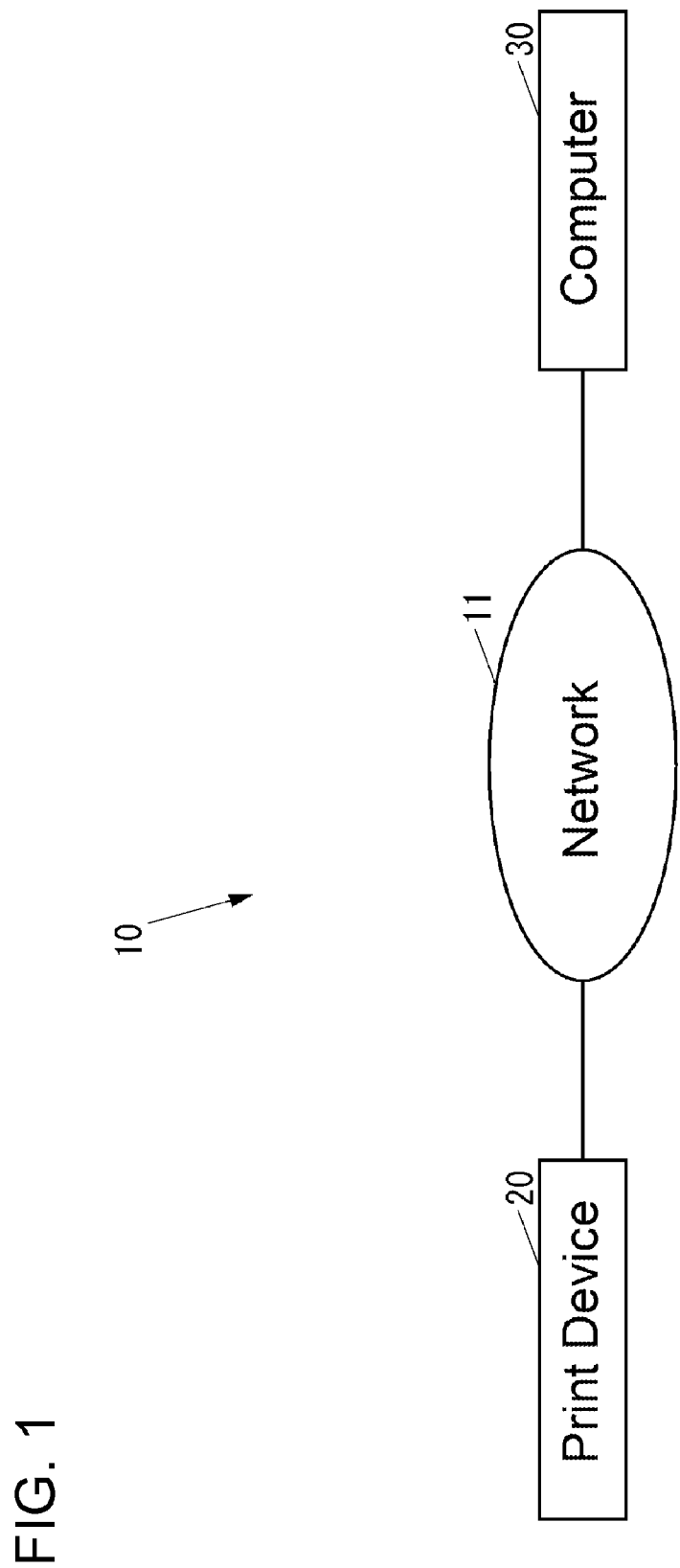
FIG. 1 illustrates a print system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a description will be given of a configuration of a print system according to the embodiment.

FIG. 1 illustrates a print system 10 according to the embodiment.

As illustrated in FIG. 1, the print system 10 includes a print device 20, such as a multifunction peripheral (MFP) or a printer-only machine, and a computer 30, such as a personal computer (PC) that inputs print data to the print device 20. The print device 20 and the computer 30 are communicatively connected to each other via a network 11, such as a local area network (LAN) or the Internet.

The print device 20 generates a print color using a color material such as a toner having amount corresponding to a CMYK value as a print color value. Namely, the print device 20 generates a print color using color materials of cyan, magenta, yellow, and black having amounts respectively corresponding to C value, M value, Y value, and K value.

The print device 20 converts an RGB value as an image color value indicating a color value included in image data, into a CMYK value as a print color value.

Figure 2:
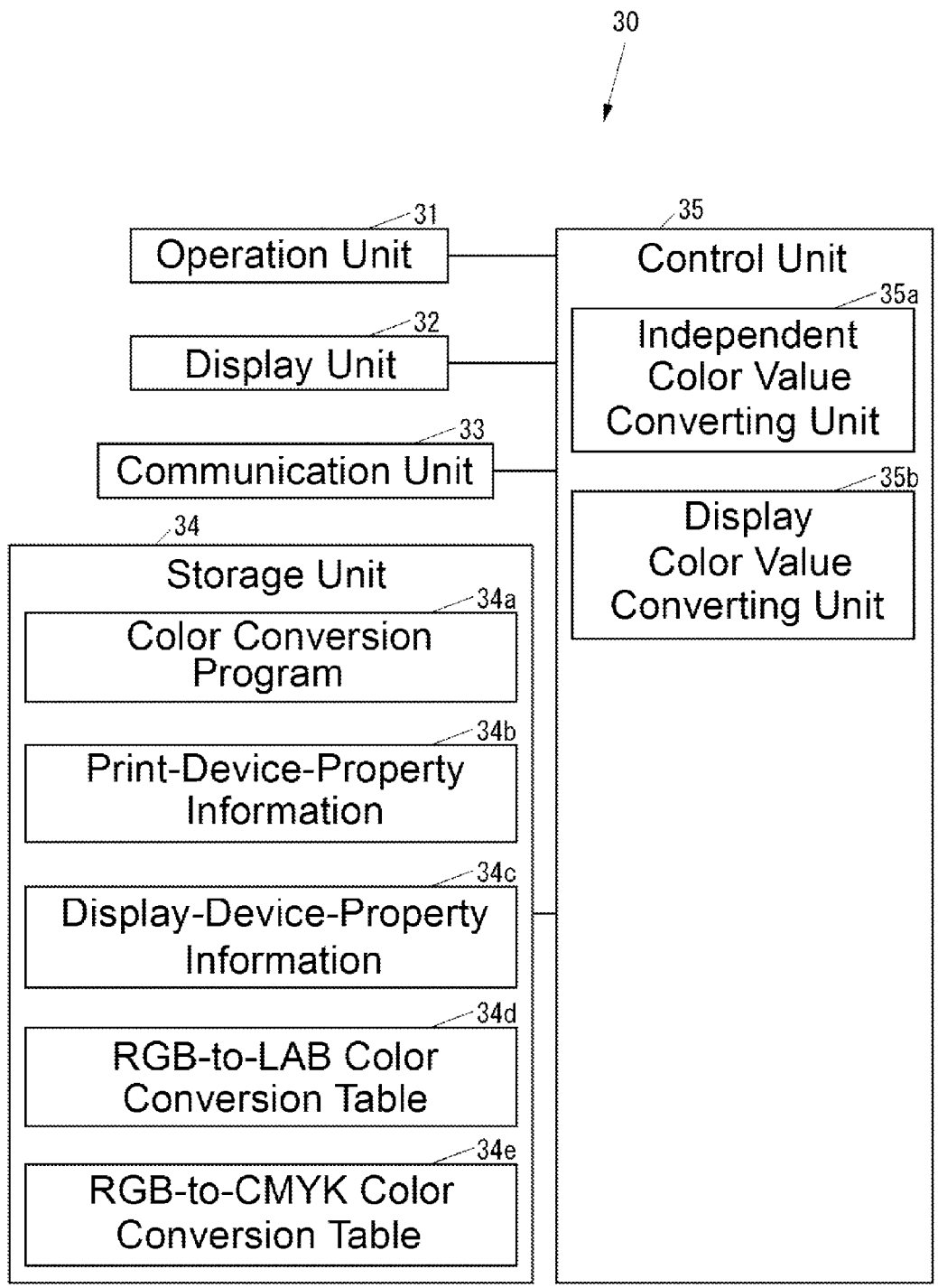
FIG. 2 illustrates a computer according to the one embodiment.

FIG. 2 illustrates the computer 30.

As illustrated in FIG. 2, the computer 30 includes an operation unit 31, a display unit 32, a communication unit 33, a storage unit 34, and a control unit 35. The operation unit 31 is an input device such as a computer mouse and a keyboard, into which various kinds of operations are input. The display unit 32 is a display device such as a liquid crystal display (LCD), which displays various kinds of information. The communication unit 33 is a communication device, which communicates with external devices such as the print device 20 (see FIG. 1) via the network 11 (see FIG. 1). The storage unit 34 is a storage device, such as a hard disk drive (HDD), which stores programs and various kinds of data. The control unit 35 controls the entire computer 30.

The storage unit 34 stores a color conversion program 34a for representing a print color by the print device 20, as a display color by the display unit 32. The color conversion program 34a may be installed into the computer 30 at the production stage of the computer 30, or may be additionally installed into the computer 30 from storage medium such as a compact disk (CD), a digital versatile disk (DVD), and a universal serial bus (USB) memory, or may be additionally installed into the computer 30 via the network 11.

The control unit 35 includes, for example, a central processing unit (CPU); a read only memory (ROM), which preliminary stores programs and various kinds of data; a random access memory (RAM), which is used as a work area for the CPU. The CPU is configured to run programs stored in the ROM or the storage unit 34.

The control unit 35 runs the color conversion program 34a stored in the storage unit 34. Accordingly, the control unit 35 works as an independent color value converting unit 35a (which is also referred to as an independent color value converting circuit) that converts an RGB value as an image color value into a CIELAB value as an independent color value, which is independent from a device, and to work as a display color value converting unit 35b (which is also referred to as a display color value converting circuit) that converts the CIELAB value converted by the independent color value converting unit 35a into an RGB value as a display color value, which is input into the display unit 32. Namely, the computer 30 configures a color converting apparatus for simulatively representing a print color by the print device 20, into a display by the display unit 32.

The storage unit 34 can store print-device-property information 34b, display-device-property information 34c, an RGB-to-LAB color conversion table 34d, and an RGB-to-CMYK color conversion table 34e. The print-device-property information 34b is a color conversion table (lookup table: LUT), which indicates the property of the print device 20. The display-device-property information 34c is a color conversion table, which indicates the property of the display unit 32. The RGB-to-LAB color conversion table 34d is independent color value conversion information for converting a RGB value as an image color value, into a CIELAB value in a color gamut of the print device 20. The RGB-to-CMYK color conversion table 34e is print-color-value conversion information for the print device 20, for converting a RGB value as an image color value into a CMYK value as a print color value. The print-device-property information 34b, the display-device-property information 34c, the RGB-to-LAB color conversion table 34d, and the RGB-to-CMYK color conversion table 34e may be acquired by, for example, an ICC profile.

Figure 3:
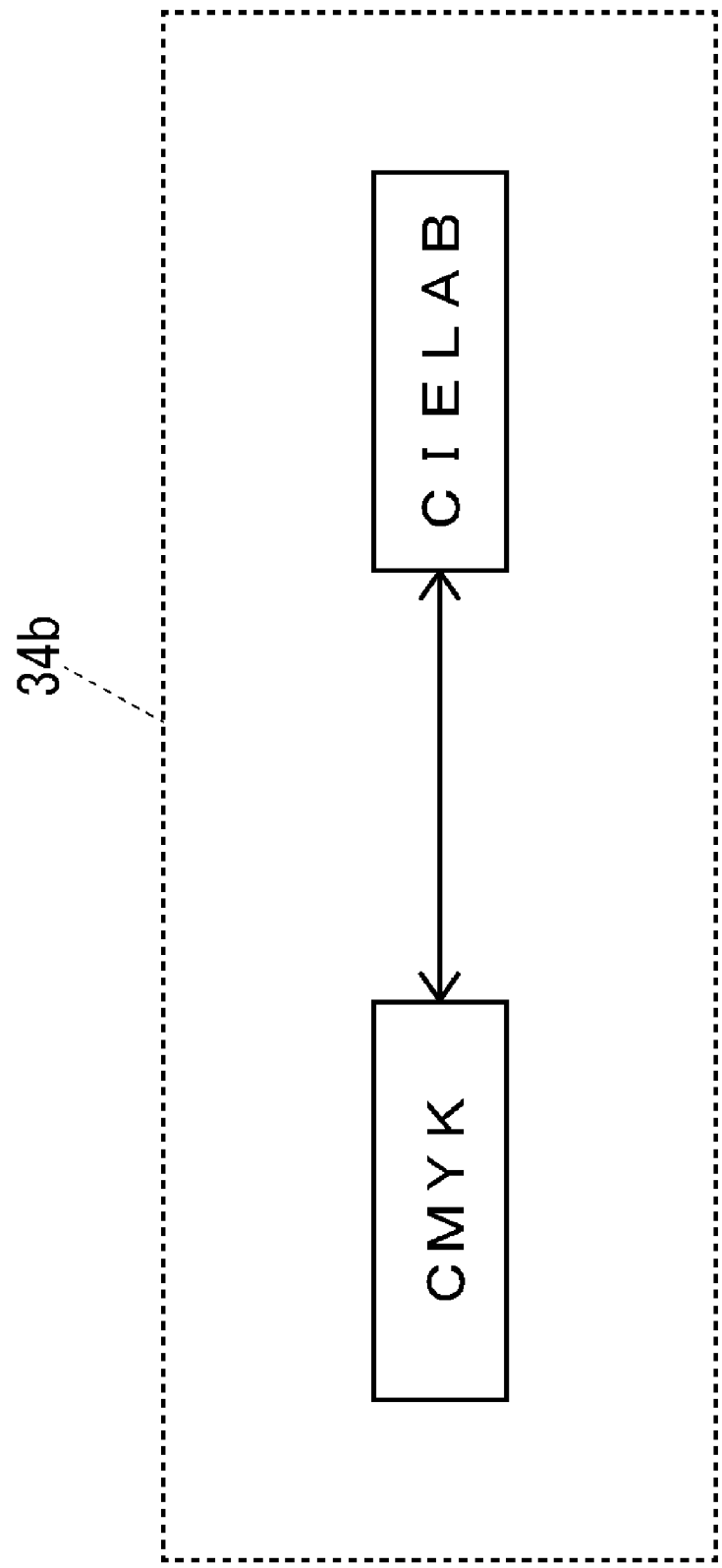
FIG. 3 illustrates print-device-property information according to the one embodiment.

FIG. 3 illustrates the print-device-property information 34b.

As illustrated in FIG. 3, the print-device-property information 34b indicates a correspondence relationship between a CMYK value as a print color value, and a CIELAB value corresponding to the CMYK value, which indicates a print color by the print device 20. The print-device-property information 34b shows that the print device 20 will generate a print color having what sort of CIELAB value if a certain CMYK value is input into the print device 20, as a print color value. Conversely, the print-device-property information 34b shows that what sort of CMYK value as a print color value, needs to be input into the print device 20 in order to cause the print device 20 to generate a print color having a certain CIELAB value.

Figure 4:
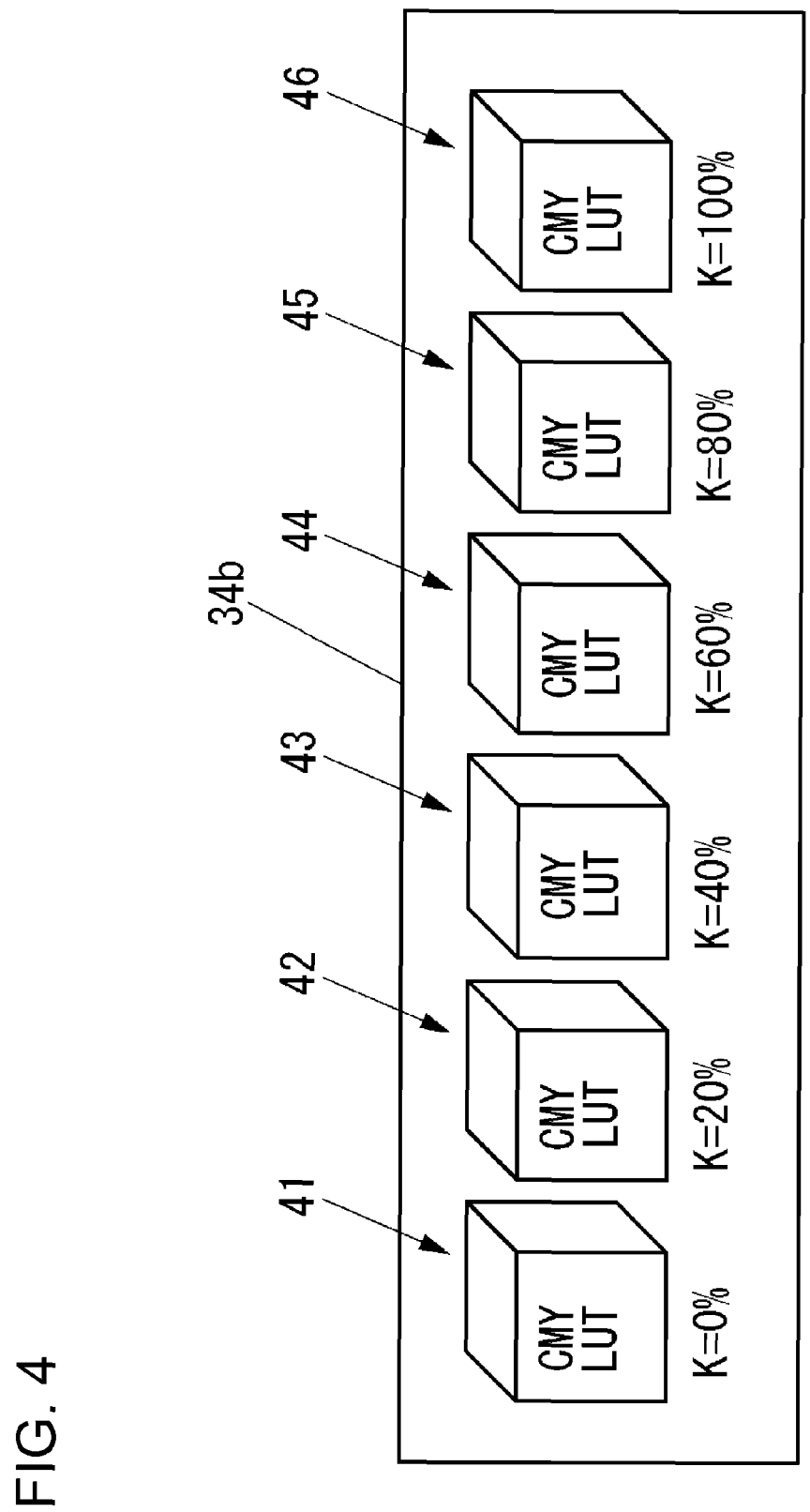
FIG. 4 illustrates color conversion tables constituting the print-device-property information according to the one embodiment.
Figure 5:
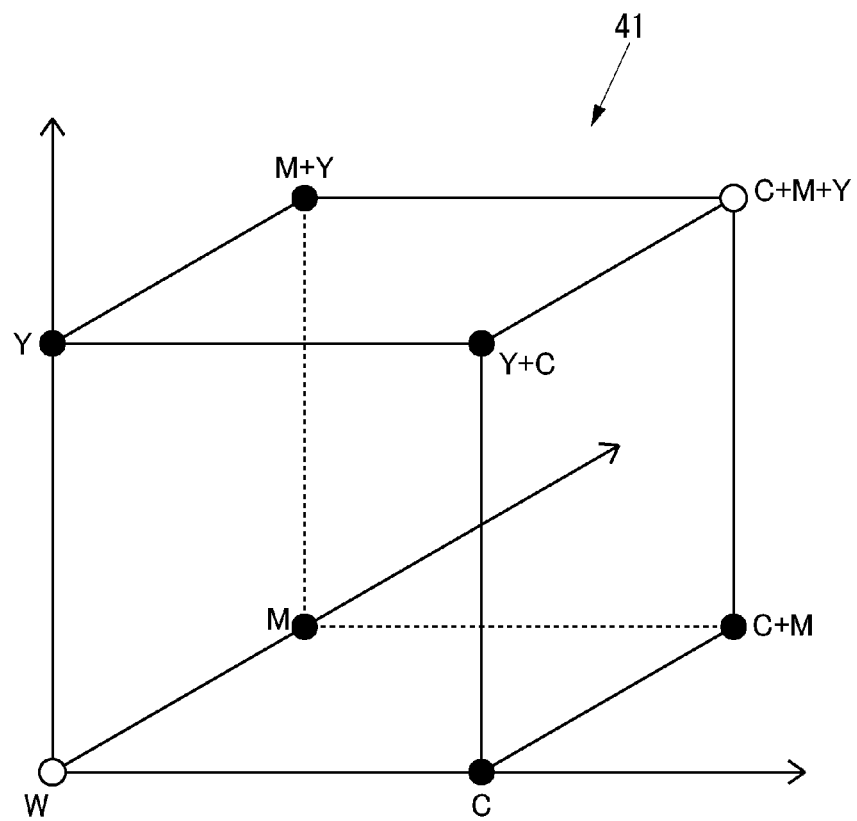
FIG. 5 illustrates one of the color conversion tables according to the one embodiment.

FIG. 4 illustrates color conversion tables constituting the print-device-property information 34b. FIG. 5 illustrates one of the color conversion tables illustrated in FIG. 4.

As illustrated in FIG. 4, the print-device-property information 34b includes a color conversion table 41, a color conversion table 42, a color conversion table 43, a color conversion table 44, a color conversion table 45, and a color conversion table 46, which have the orthogonal coordinate system of CMY value illustrated in FIG. 5. The color conversion tables 41, 42, 43, 44, 45, and 46 have fixed K values of CMYK values, which are respectively 0%, 20%, 40%, 60%, 80%, 100%. That is, with the print-device-property information 34b, four-dimensional CMYK values data is administered by the information's furnishing three-dimensional CMY value color conversion tables on a per K-content percentage basis.

Figure 6:
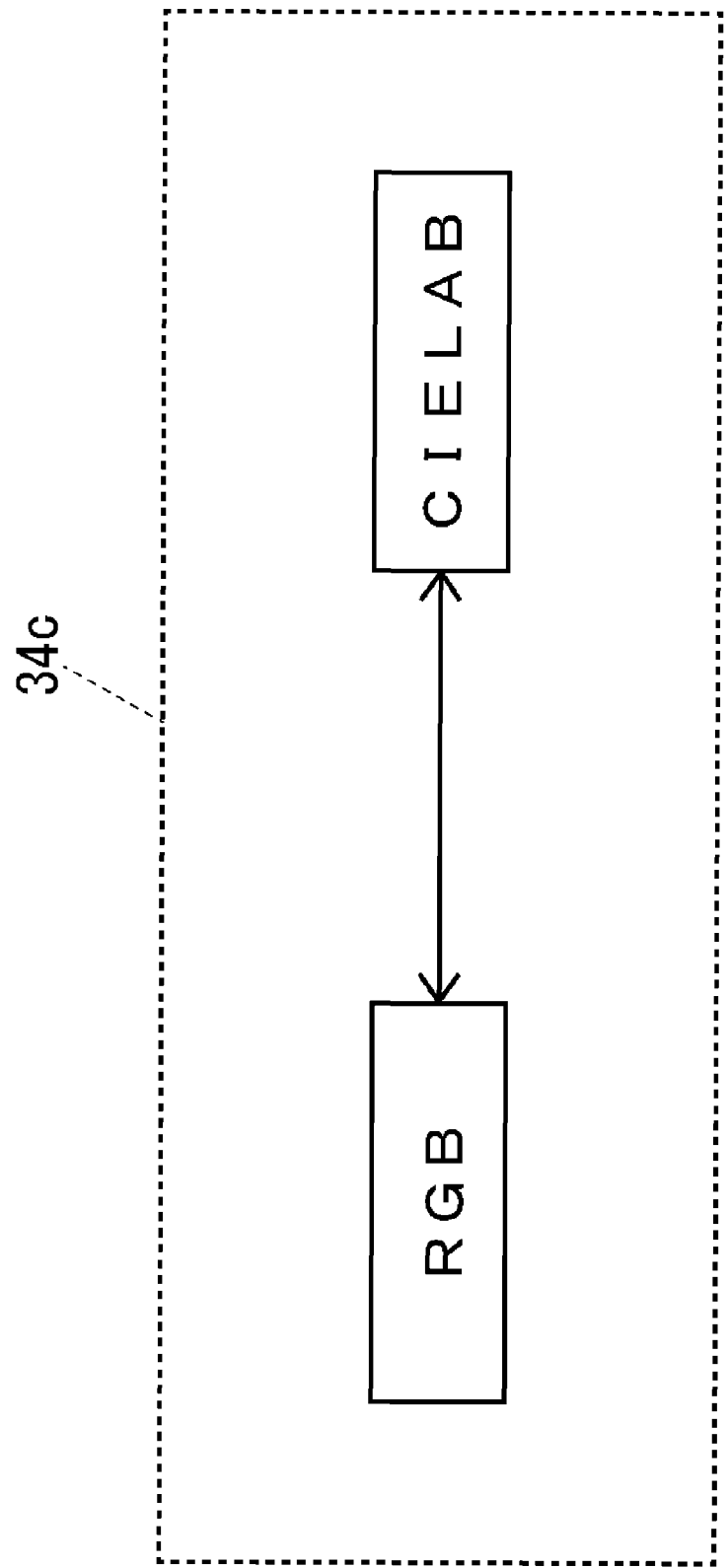
FIG. 6 illustrates the display-device-property information according to the one embodiment.

FIG. 6 illustrates the display-device-property information 34c.

As illustrated in FIG. 6, the display-device-property information 34c indicates a correspondence relationship between a RGB value as a display color value, and a CIELAB value corresponding to the RGB value, which indicates a display color by the display unit 32. The display-device-property information 34c shows that the display unit 32 will generate a display color having what sort of CIELAB value if a certain RGB value is input into the display unit 32, as a display color value. Conversely, the display-device-property information 34c shows that what sort of RGB value as a print color value, needs to be input into the display unit 32 in order to cause the display unit 32 to generate a display color having a certain RGB value.

Figure 7A:
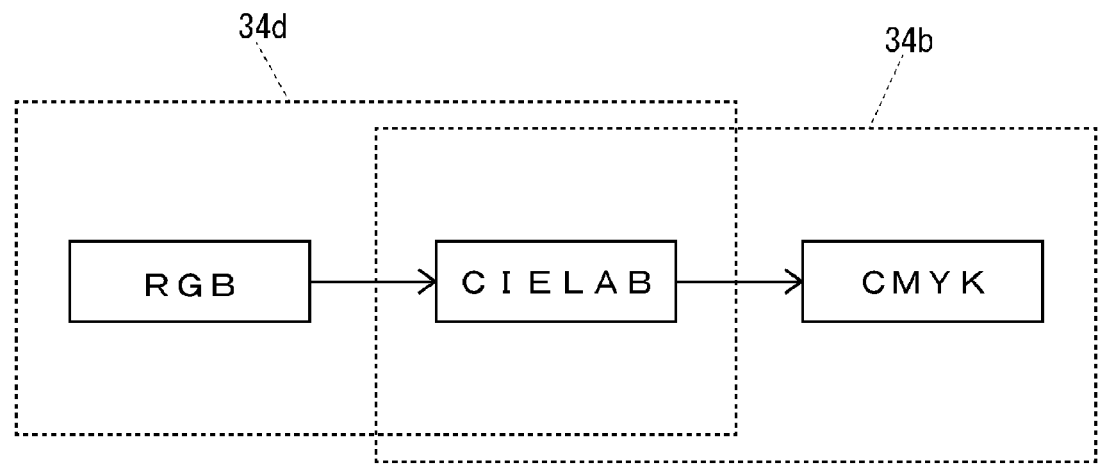
FIG. 7A illustrates a two phase conversion method among conversion methods that convert an image color value into a print color value in the print device according to the one embodiment.
Figure 7B:
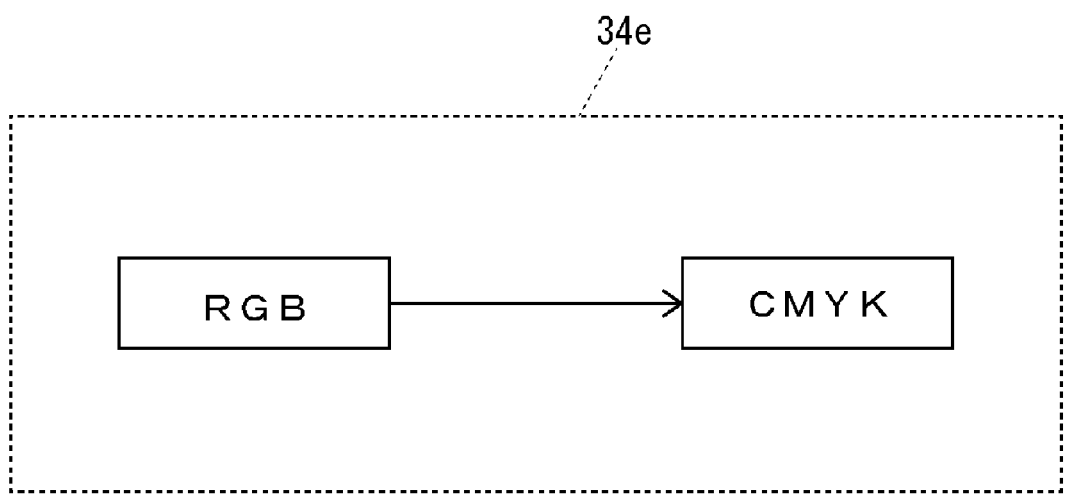
FIG. 7B illustrates a device link profile method among the conversion methods that convert an image color value into a print color value in the print device according to the one embodiment.

FIGS. 7A and 7B illustrate conversion methods in the print device 20, which convert an image color value into a print color value.

The conversion methods in the print device 20, which convert an image color value into a print color value, include a two phase conversion method illustrated in FIG. 7A and a device link profile method illustrated in FIG. 7B.

The two phase conversion method illustrated in FIG. 7A converts a RGB value as an image color value, into a CIELAB value based on the RGB-to-LAB color conversion table 34d, and then converts the CIELAB value into a CMYK value as a print color value, based on the print-device-property information 34b. Here, the RGB-to-LAB color conversion table 34d indicates a correspondence relationship between a RGB value as an image color value, and a CIELAB value in the color gamut of the print device 20. Namely, in the RGB-to-LAB color conversion table 34d, a CIELAB value is a value obtained by gamut (color gamut) mapping a RGB value into the color gamut of the print device 20. The RGB-to-CMYK color conversion table 34e is not required when the print device 20 converts an image color value into a print color value by the two phase conversion method illustrated in FIG. 7A.

The device link profile method illustrated in FIG. 7B directly converts a RGB value as an image color value, into a CMYK value as a print color value, based on the RGB-to-CMYK color conversion table 34e. Here, the RGB-to-CMYK color conversion table 34e indicates a correspondence relationship for the print device 20 between a RGB value as an image color value, and a CMYK value as a print color value. The RGB-to-LAB color conversion table 34d is not required when the print device 20 converts an image color value into a print color value by the device link profile method illustrated in FIG. 7B.

Next, a description will be given of the operation of the computer 30.

Figure 8:
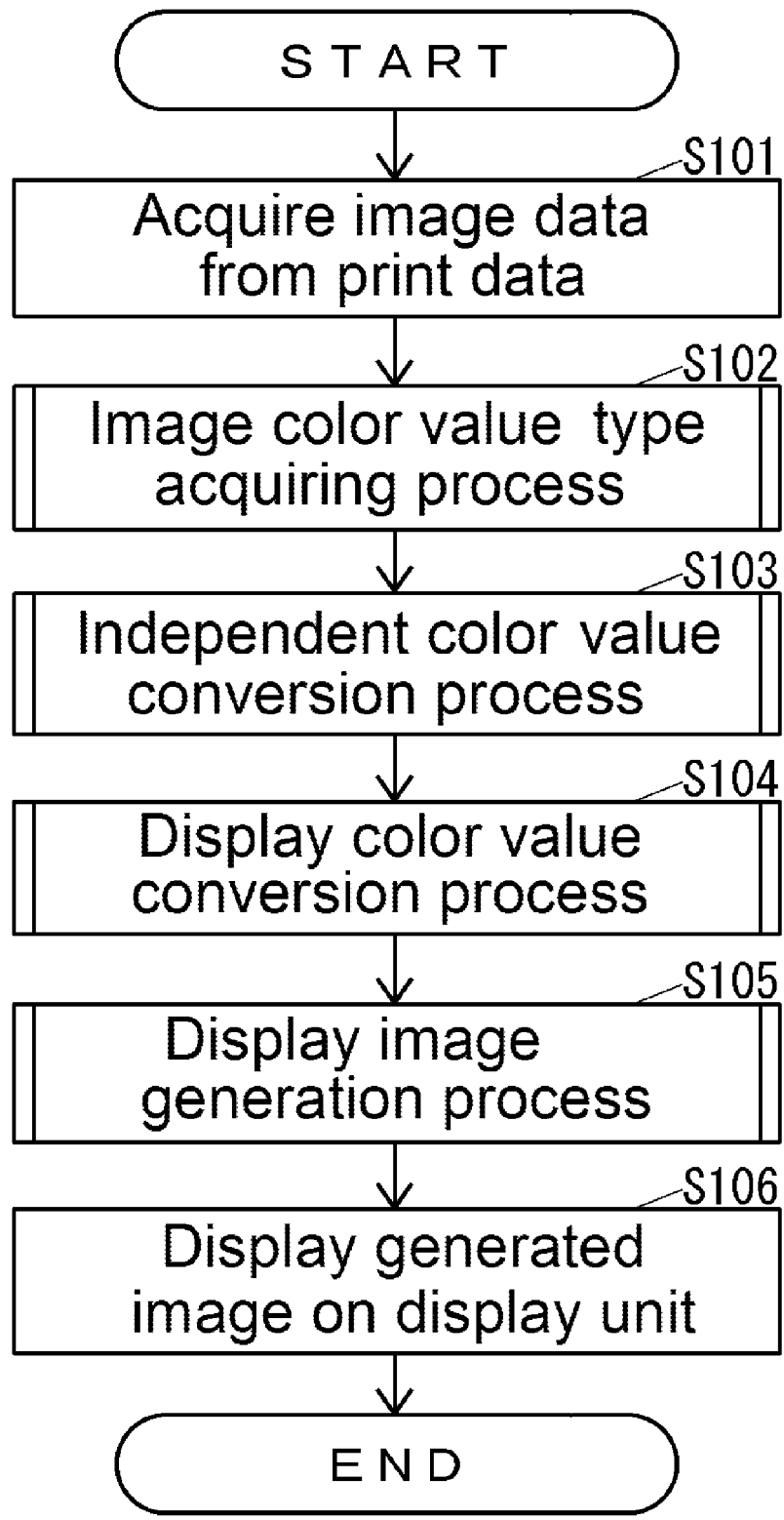
FIG. 8 illustrates an operation of the computer according to the one embodiment.

FIG. 8 illustrates the operation of the computer 30.

As illustrated in FIG. 8, the control unit 35 of the computer 30 acquires image data by extracting a color image portion from print data (Step S101).

Then, the control unit 35 performs an image color value type acquiring process that acquires a color value, or an image color value type, included in the image data acquired in Step S101 (Step S102).

Here, the identical color value may be used in more than one pixel in the image data. This may increase a load of the computer 30 to increase processing time if the color values of all pixels included in the image data go through a subsequent color converting process.

All types of RGB values may not always be used in the image data. This may also increase a load of the computer 30 to increase processing time if all types of RGB values go through a subsequent color converting process.

Thus, the control unit 35 acquires an image color value type in Step S102 to reduce the amount of data targeted to be processed in a subsequent color converting process in order to reduce a load of the computer 30 in the subsequent color converting process.

Figure 9:
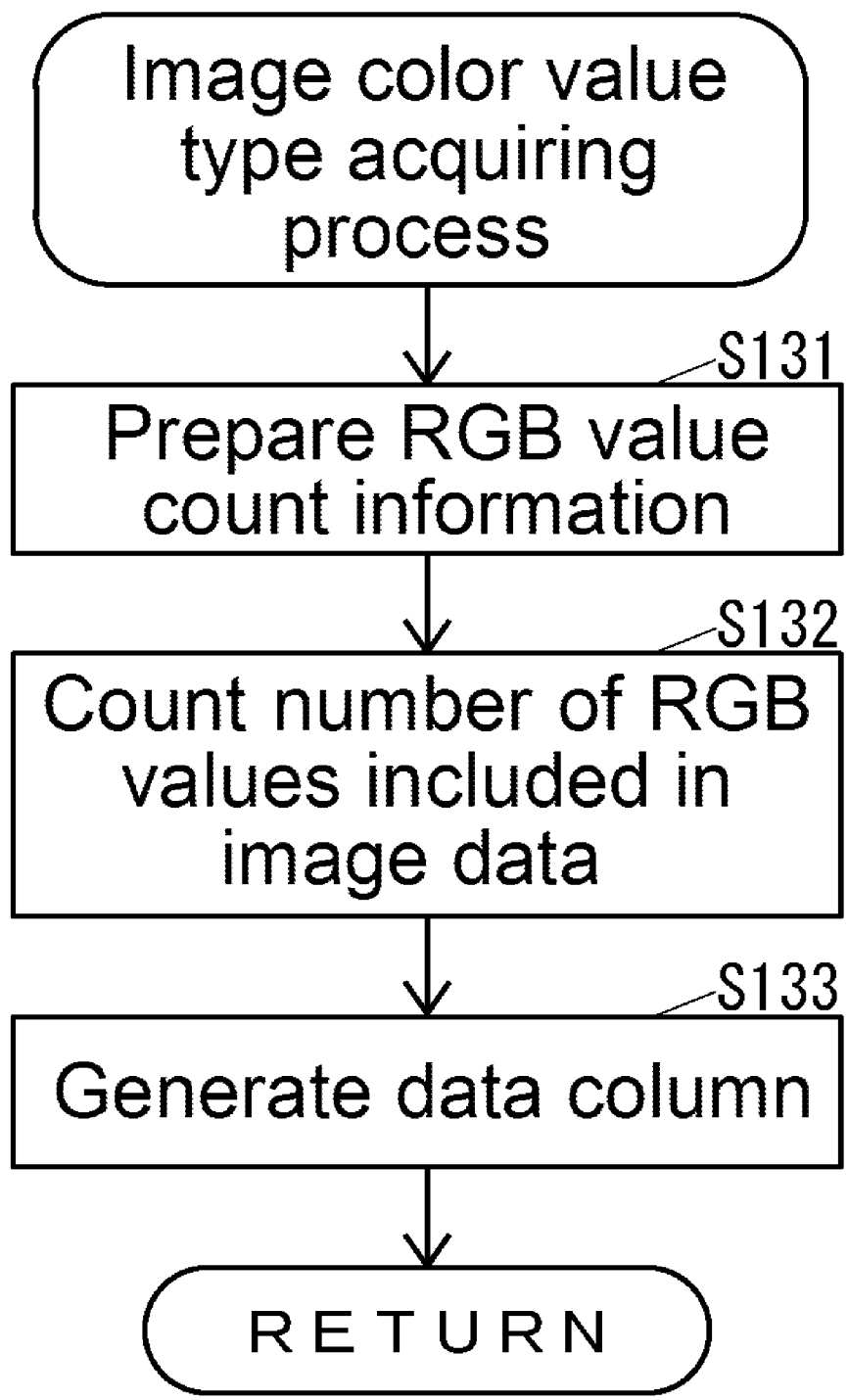
FIG. 9 illustrates an image color value type acquiring process according to the one embodiment.

FIG. 9 illustrates the image color value type acquiring process of Step S102.

As illustrated in FIG. 9, the control unit 35 prepares RGB value count information 50 (see FIG. 10) for counting the number of RGB values included in the image data (Step S131).

FIG. 10 illustrates the exemplary RGB value count information 50.

As illustrated in FIG. 10, the RGB value count information 50 is for examining the appearance number of the respective all the types of RGB values in the image data. At immediately after the process of Step S131, the appearance number of each of all the types of RGB values in the image data is zero. In the example illustrated in FIG. 10, R value, G value, and B value each have 256 types, which is 0 to 255. Namely, in the example illustrated in FIG. 10, RGB value has 16777216 (=256×256×256) types.

Here, the image data includes a coordinate position in the image and a color value for each pixel. As illustrated in FIG. 9, after the process of Step S131, the control unit 35 counts the number of RGB values included in the image data by targeting each pixel included in the image data one by one based on the coordinate positions of the pixels included in the image data, and increasing, one by one, the appearance number of RGB values as a color value of each pixel in the RGB value count information (Step S132).

Then, the control unit 35 generates a data column 60 (see FIG. 11) constituted by the RGB values, the appearance number of which is equal to or more than one in the RGB value count information 50, and then terminates the image color value type acquiring process illustrated in FIG. 9 (Step S133).

FIG. 11 illustrates an exemplary data column 60 generated in the image color value type acquiring process illustrated in FIG. 9.

As illustrated in FIG. 11, the data column 60 is information including color values or image color value types included in the image data.

As illustrated in FIG. 8, after the image color value type acquiring process of Step S102, the independent color value converting unit 35a performs an independent color value conversion process that converts a RGB value as an image color value, included in the data column 60 into a CIELAB value indicating a print color by the print device 20, corresponding to a CMYK value as a print color value, converted from the RGB value (Step S103).

Figure 12:
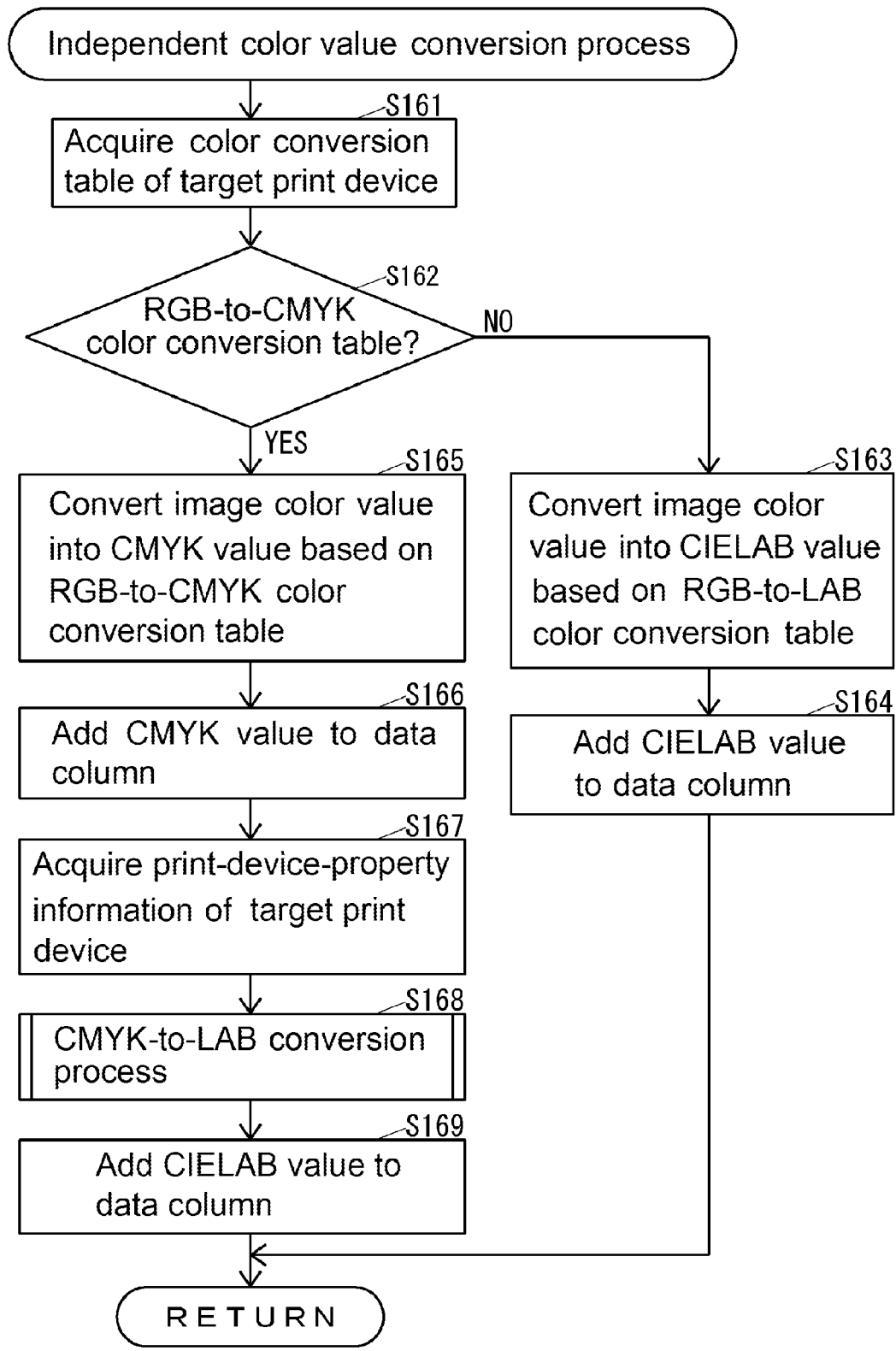
FIG. 12 illustrates an independent color value conversion process according to the one embodiment.

FIG. 12 illustrates the independent color value conversion process of Step S103.

As illustrated in FIG. 12, the independent color value converting unit 35a acquires a color conversion table of the target print device 20 (Step S161).

Here, the conversion methods in the print device 20, which convert an image color value into a print color value, include the two phase conversion method and the device link profile method as described above. In Step S161, the independent color value converting unit 35a acquires only RGB-to-LAB color conversion table 34d among the print-device-property information 34b and the RGB-to-LAB color conversion table 34d, as a color conversion table of the print device 20 when the print device 20 uses the two phase conversion method. The independent color value converting unit 35a acquires the RGB-to-CMYK color conversion table 34e as a color conversion table of the print device 20 when the print device 20 uses the device link profile method.

The independent color value converting unit 35a acquires a color conversion table targeted to be acquired, which is stored in the storage unit 34, from the storage unit 34, and acquires a color conversion table targeted to be acquired, which is not stored in the storage unit 34, from the print device 20. Obviously, the independent color value converting unit 35a may acquire a color conversion table from the print device 20 at every process of Step S161 regardless of whether or not the color conversion table targeted to be acquired is stored in the storage unit 34.

After the process of Step S161, the independent color value converting unit 35a determines whether or not a color conversion table acquired in Step S161 is the RGB-to-CMYK color conversion table 34e (Step S162).

The independent color value converting unit 35a, which has determined in Step S162 that the acquired color conversion table is not the RGB-to-CMYK color conversion table 34e, namely, the acquired color conversion table is the RGB-to-LAB color conversion table 34d, converts a RGB value as an image color value, included in the data column 60 into a CIELAB value based on the RGB-to-LAB color conversion table 34d acquired in Step S161 (Step S163).

Here, even if a RGB value as an image color value, included in the data column 60 is not defined in the RGB-to-LAB color conversion table 34d, the independent color value converting unit 35a can calculate, by interpolation operation, a CIELAB value corresponding to the RGB value as an image color value, included in the data column 60 based on the RGB-to-LAB color conversion table 34d.

Figure 13:
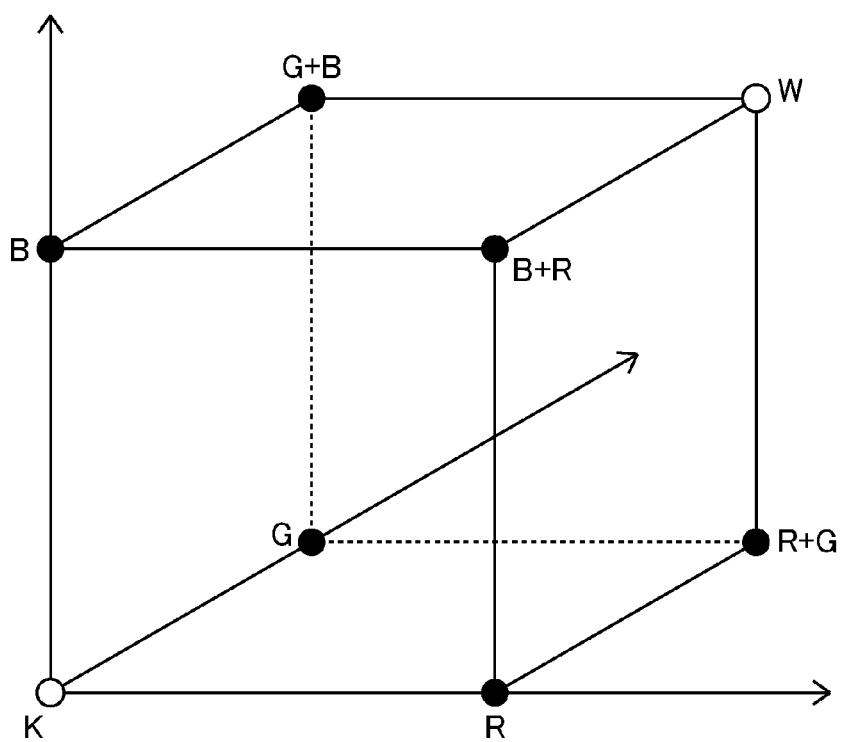
FIG. 13 illustrates grid point locations of an RGB value in the orthogonal coordinate system included in the RGB-to-LAB color conversion table according to the one embodiment.
Figure 14A:
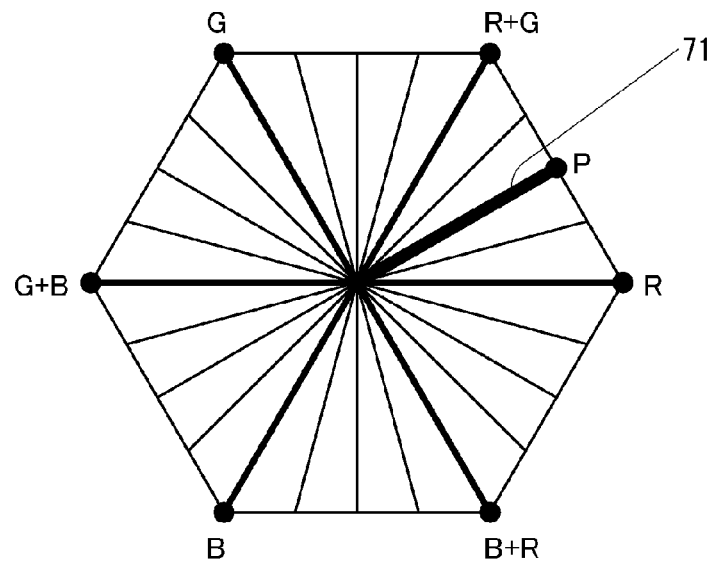
FIG. 14A illustrates grid point locations of an RGB value in the circular cylinder coordinate system included in the RGB-to-LAB color conversion table according to the one embodiment, where the view is observed from a point having the maximum lightness to a point having the minimum lightness.
Figure 14B:
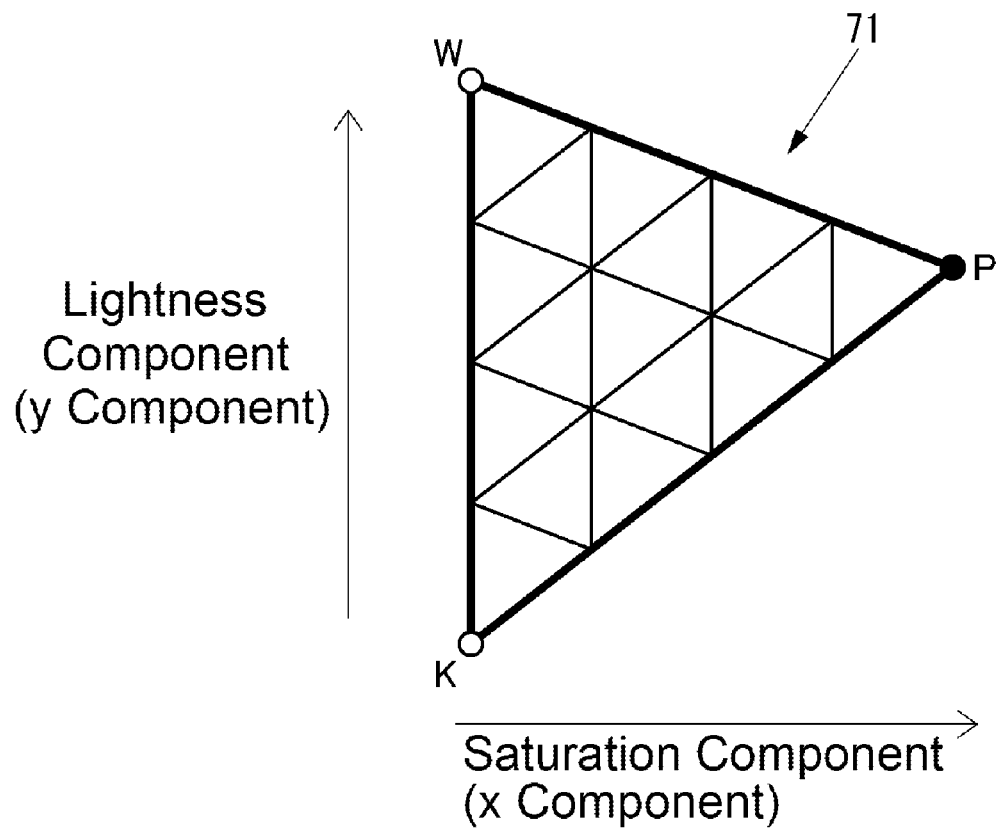
FIG. 14B illustrates an exemplary equal hue plane of the grid point locations illustrated in FIG. 14A.

FIG. 13 illustrates grid point locations in the orthogonal coordinate system of a RGB values included in the RGB-to-LAB color conversion table 34d. FIG. 14A illustrates grid point locations of a RGB value in the circular cylinder coordinate system included in the RGB-to-LAB color conversion table 34d, where the view is observed from a point having the maximum lightness to a point having the minimum lightness. FIG. 14B illustrates an exemplary equal hue plane of the grid point locations illustrated in FIG. 14A.

In FIG. 13 and FIGS. 14A and 14B, "R" indicates R value or red; "G" indicates G value or green; "B" indicates B value or blue; "W" indicates white; and "K" indicates black. In FIGS. 14A and 14B, a point P indicates a point having the highest saturation in the equal hue plane including the point P.

As illustrated in FIG. 13, a RGB value included in the RGB-to-LAB color conversion table 34d can be represented as a cube in the orthogonal coordinate system having three axes including R axis, G axis, and B axis.

A set of the coordinates of the RGB value constituting the cube illustrated in FIG. 13 is converted into the circular cylinder coordinate system illustrated in FIGS. 14A and 14B. In FIG. 14B, the vertical axis indicates lightness, and the upper point of the vertical axis has higher lightness. The distance from the vertical axis indicates saturation, and the farther point from the vertical axis has higher saturation. The angle, the central axis of which is the vertical axis, indicates hue. In the circular cylinder coordinate system illustrated in FIGS. 14A and 14B, the RGB value included in RGB-to-LAB color conversion table 34d forms, for example, 24 pieces of equal hue planes such as an equal hue plane 71.

Figure 15A:
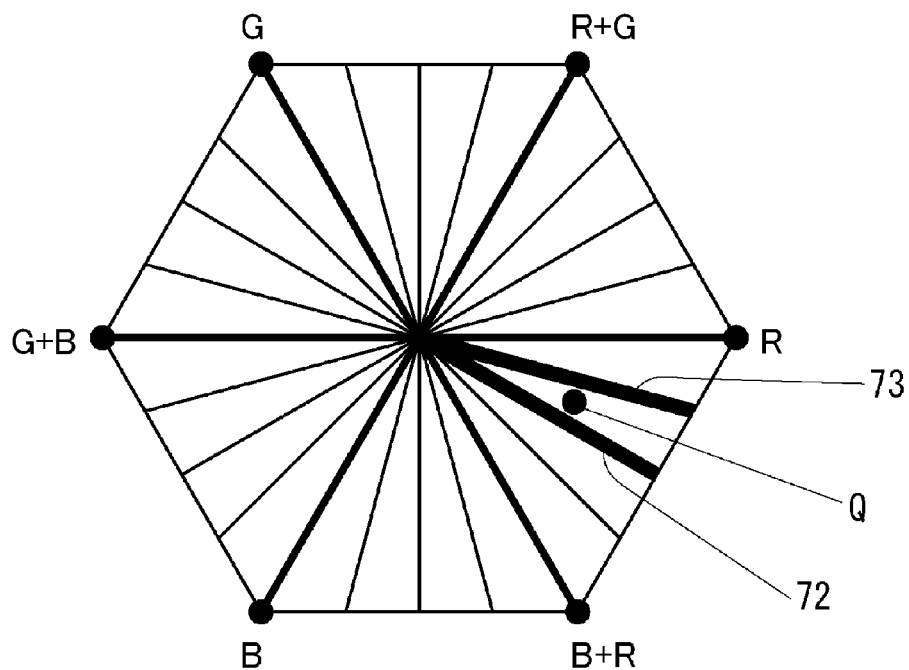
FIG. 15A illustrates an exemplary point Q indicating any RGB value in the circular cylinder coordinate system illustrated in FIGS. 14A and 14B.
Figure 15B:
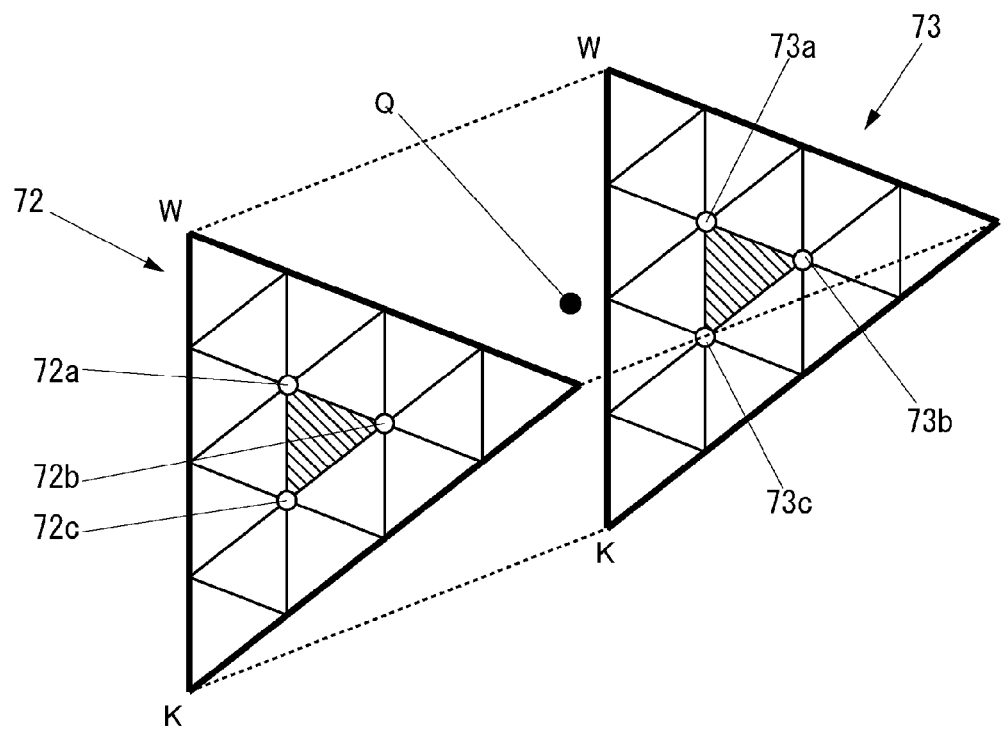
FIG. 15B illustrates a relation between the point Q, and two adjacent equal hue planes sandwiching the point Q illustrated in FIG. 15A.

FIG. 15A illustrates an exemplary point Q indicating any RGB value in the circular cylinder coordinate system illustrated in FIGS. 14A and 14B. FIG. 15B illustrates a relation between the point Q, and two adjacent equal hue planes sandwiching the point Q illustrated in FIG. 15A.

The independent color value converting unit 35a calculates a CIELAB value corresponding to the point Q illustrated in FIGS. 15A and 15B as follows. First, the independent color value converting unit 35a calculates the hue of the point Q from the RGB value of the point Q to identify two equal hue planes, namely, an equal hue plane 72 and an equal hue plane 73 that sandwich the point Q. Here, the equal hue plane 72 is an equal hue plane that is the closest to the point Q among the equal hue planes having a hue angle smaller than that of the point Q. The equal hue plane 73 is an equal hue plane that is the closest to the point Q among the equal hue planes having a hue angle larger than that of the point Q. Next, the independent color value converting unit 35a identifies three points, which are a point 72a, a point 72b and a point 72c, surrounding points, the saturation and lightness of which are the identical as those of the point Q in the equal hue plane 72. Similarly, the independent color value converting unit 35a identifies three points, which are a point 73a, a point 73b and a point 73c, surrounding points, the saturation and lightness of which are the identical as those of the point Q in the equal hue plane 73. Here, the points 72a to 72c and the points 73a to 73c are points that indicate any one of the RGB values included in the RGB-to-LAB color conversion table 34d. Finally, the independent color value converting unit 35a can calculate the CIELAB value of the point Q from the CIELAB values corresponding to the points 72a to 72c and the points 73a to 73c in the RGB-to-LAB color conversion table 34d by performing interpolation operation based on the positional relation of the point Q, the points 72a to 72c and the points 73a to 73c in the circular cylinder coordinate system illustrated in FIGS. 15A to 15B.

As illustrated in FIG. 12, after the process of Step S163, the independent color value converting unit 35a adds the CIELAB values, as print color values, converted in Step S163 to the data column 60 (Step S164), and then terminates the independent color value conversion process illustrated in FIG. 12.

FIG. 16 illustrates the exemplary data column 60, to which CIELAB values are added.

The data column 60 illustrated in FIG. 16 is information for mapping a RGB value as an image color value to a CIELAB value. Although FIG. 16 illustrates empty fields for L value, a value, and b value of the CIELAB values, those fields have specific values in practice.

As illustrated in FIG. 12, the independent color value converting unit 35a, which has determined in Step S162 that the acquired color conversion table is the RGB-to-CMYK color conversion table 34e, converts a RGB value as an image color value, included in the data column 60 into a CMYK value based on the RGB-to-CMYK color conversion table 34e of Step S161 (Step S165).

Here, even if a RGB value as an image color value, included in the data column 60 is not defined in the RGB-to-CMYK color conversion table 34e, the independent color value converting unit 35a can calculate, by interpolation operation similar to the interpolation operation explained in the process of Step S163, a CMYK value corresponding to a RGB value as an image color value, included in the data column 60 based on the RGB-to-CMYK color conversion table 34e.

After the process of Step S165, the independent color value converting unit 35a adds the CMYK values converted in Step S165 to the data column 60 (Step S166).

FIG. 17 illustrates the exemplary data column 60, to which CMYK values are added.

The data column 60 illustrated in FIG. 17 is information for mapping a RGB value as an image color value, to a CMYK value. Although FIG. 17 illustrates empty fields for C value, M value, Y value, and K value of the CMYK values, those fields have specific values in practice.

As illustrated in FIG. 12, after the process of Step S166, the independent color value converting unit 35a acquires the print-device-property information 34b of the target print device 20 (Step S167).

Here, the independent color value converting unit 35a may acquire the print-device-property information 34b from the storage unit 34 when the print-device-property information 34b targeted to be acquired is stored in the storage unit 34. The independent color value converting unit 35a acquires the print-device-property information 34b from the print device 20 when the print-device-property information 34b targeted to be acquired is not stored in the storage unit 34. Obviously, the independent color value converting unit 35a may acquire the print-device-property information 34b from the print device 20 at every process of Step S167 regardless of whether or not the print-device-property information 34b targeted to be acquired is stored in the storage unit 34.

After the process of Step S167, the independent color value converting unit 35a performs a CMYK-to-LAB conversion process that converts a CMYK value as a print color value, included in the data column 60 into a CIELAB value indicating a print color by the print device 20, corresponding to the CMYK value based on the print-device-property information 34b acquired in the process of Step S167 (Step S168).

Figure 18A:
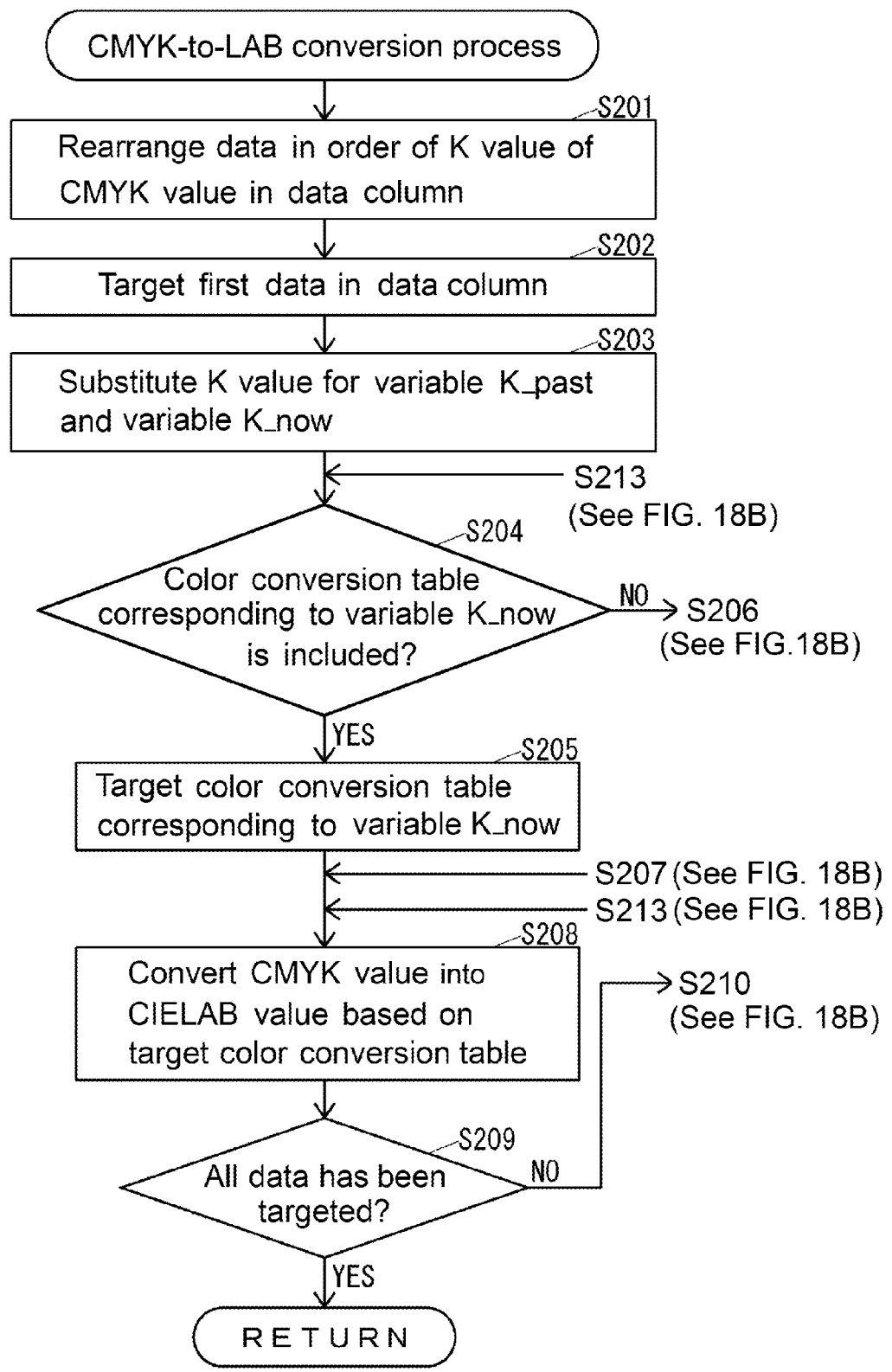
FIGS. 18A and 18B illustrate the CMYK-to-LAB conversion process illustrated in FIG. 12.
Figure 18B:
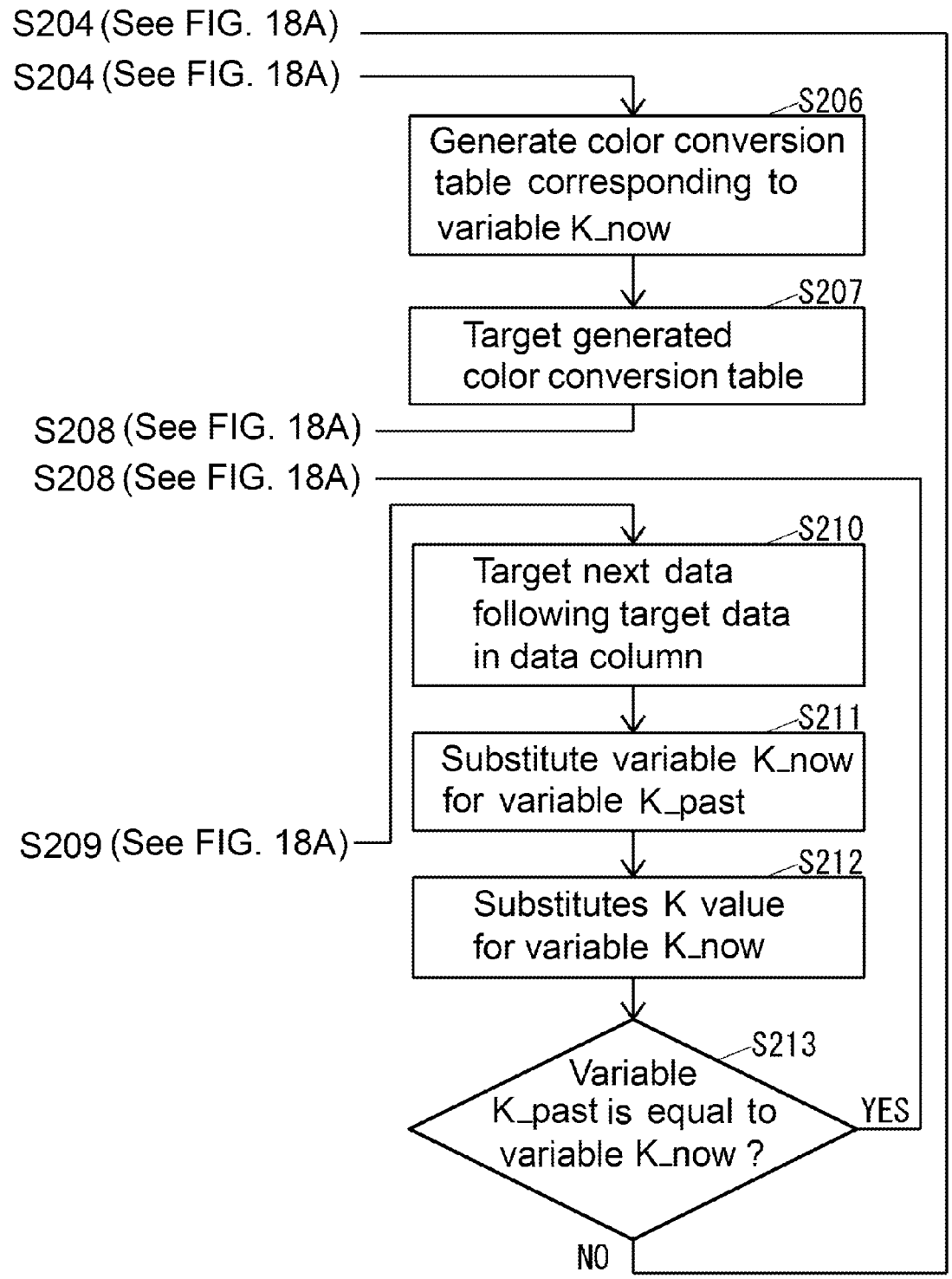

FIGS. 18A and 18b illustrate the CMYK-to-LAB conversion process of Step S168.

As illustrated in FIG. 18A, the independent color value converting unit 35a rearranges the respective pieces of data in the order of K values of CMYK values in the data column 60 (Step S201).

Then, the independent color value converting unit 35a targets the first data in the data column 60 (Step S202).

Then, the independent color value converting unit 35a substitutes, as an initial setting, K value of the target data for a variable K_past and a variable K_now (Step S203). Here, the variable K_past is a variable indicating K value of the previous target data in a loop process of the CMYK-to-LAB conversion process. The variable K_now is a variable indicating K value of the current target data in a loop process of the CMYK-to-LAB conversion process.

After the process of Step S203, the independent color value converting unit 35a determines whether or not a color conversion table corresponding to a value of the variable K_now is included in the print-device-property information 34b (Step S204). Specifically, the independent color value converting unit 35a determines, in Step S204 that the color conversion table corresponding to the value of the variable K_now is included in the print-device-property information 34b when the value of the variable K_now is any one of 0, 20, 40, 60, 80 and 100.

The independent color value converting unit 35a, which has determined in Step S204 that the color conversion table corresponding to the value of the variable K_now is included in the print-device-property information 34b, targets the color conversion table corresponding to the value of the variable K_now among the color conversion tables included in the print-device-property information 34b (Step S205). Specifically, the independent color value converting unit 35a respectively targets the color conversion tables 41, 42, 43, 44, 45, and 46 (see FIG. 4) when the value of the variable K_now in 0, 20, 40, 60, 80, and 100.

The independent color value converting unit 35a, which has determined in Step S204 that the color conversion table corresponding to the value of the variable K_now is not included in the print-device-property information 34b, generates a color conversion table corresponding to the value of the variable K_now based on the color conversion table included in the print-device-property information 34b (Step S206).

Specifically, the independent color value converting unit 35a calculates a value that is smaller than and closest to the value of the variable K_now (hereinafter refer to as "closest small value") among 0, 20, 40, 60, 80 and 100, and then identifies a color conversion table corresponding to the closest small value included in the print-device-property information 34b (hereinafter refer to as "closest small value table"). Similarly, the independent color value converting unit 35a calculates a value that is larger than and closest to the value of the variable K_now (hereinafter refer to as "closest large value") among 0, 20, 40, 60, 80 and 100, and then identifies a color conversion table corresponding to the closest large value included in the print-device-property information 34b (hereinafter refer to as "closest large value table"). Then, the independent color value converting unit 35a performs linear interpolation operation from a CIELAB value corresponding to a CMY value in the closest small value table, and a CIELAB value mapped from a CMY value identical to this CMY value in the closest large value table based on a ratio of a difference between the closest small value and the value of the variable K_now, to a difference between the value of the variable K_now and the closest large value. The independent color value converting unit 35a performs the linear interpolation operation for all the CMY values included in the closest small value table and the closest large value table to generate a color conversion table corresponding to the value of the variable K_now.

After the process of Step S206, the independent color value converting unit 35a targets the color conversion table generated in Step S206 (Step S207).

After the process of Step S205 or Step S207, the independent color value converting unit 35a converts a CMYK value of the target data into a CIELAB value based on the target color conversion table (Step S208). Specifically, the independent color value converting unit 35a acquires four points surrounding the CMY values of the target data among grid points of the CMY value in the target color conversion table, and performs tetrahedron interpolating operation from CIELAB values corresponding to the acquired four points based on a positional relation between CMY values of the four points and the CMY value of the target data to calculate the CIELAB value of the target data.

After the process of Step S208, the independent color value converting unit 35a determines whether or not all data in the data column 60 has been targeted (Step S209).

The independent color value converting unit 35a, which has determined in Step S209 that the data which has not been targeted yet exists in the data column 60, targets next data following the target data in the data column 60 (Step S210).

Then, the independent color value converting unit 35a substitutes a value of the variable K_now for the variable K_past (Step S211).

Then, the independent color value converting unit 35a substitutes K value of the target data for the variable K_now (Step S212).

Then, the independent color value converting unit 35a determines whether or not the value of the variable K_past is equal to the value of the variable K_now (Step S213).

The independent color value converting unit 35a, which has determined in Step S213 that a value of the variable K_past is not equal to a value of the variable K_now, needs to change the target color conversion table, and then performs the process of Step S204.

The independent color value converting unit 35a, which has determined in Step S213 that a value of the variable K_past is equal to a value of the variable K_now, does not need to change the target color conversion table, and then performs the process of Step S208.

The independent color value converting unit 35a, which has determined in Step S209 that all data in the data column 60 have been targeted, terminates the CMYK-to-LAB conversion process illustrated in FIG. 18A.

As illustrated in FIG. 12, after the CMYK-to-LAB conversion process of Step S168, the independent color value converting unit 35a adds the CIELAB values converted in Step S168 to the data column 60 (Step S169), and then terminates the independent color value conversion process illustrated in FIG. 12.

FIG. 19 illustrates the exemplary data column 60, to which CIELAB values are added.

The data column 60 illustrated in FIG. 19 is information for mapping a RGB value as an image color value, to a CMYK value as a print color value, and to a CIELAB value. Although FIG. 19 illustrates empty fields for C value, M value, Y value, and K value of the CMYK values and L value, a value, and b value of the CIELAB values, those fields have specific values in practice.

As illustrated in FIG. 8, after the independent color value conversion process of Step S103, the display color value converting unit 35b performs a display color value conversion process that converts a CIELAB value included in the data column 60 into a RGB value as a display color value, which is input to the display unit 32 (Step S104).

Figure 20A:
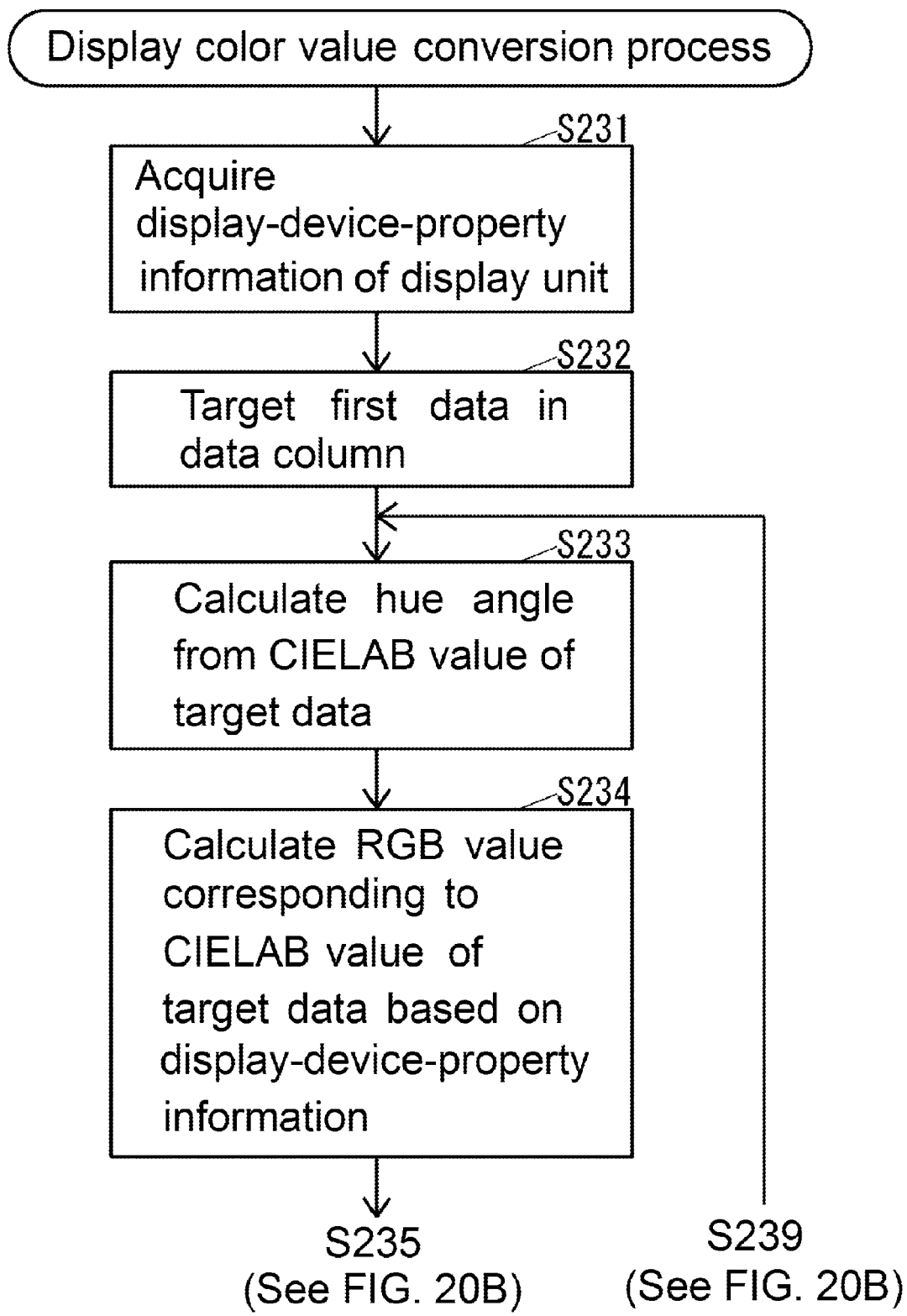
FIGS. 20A and 20B illustrate the display color value conversion process according to the one embodiment.
Figure 20B:
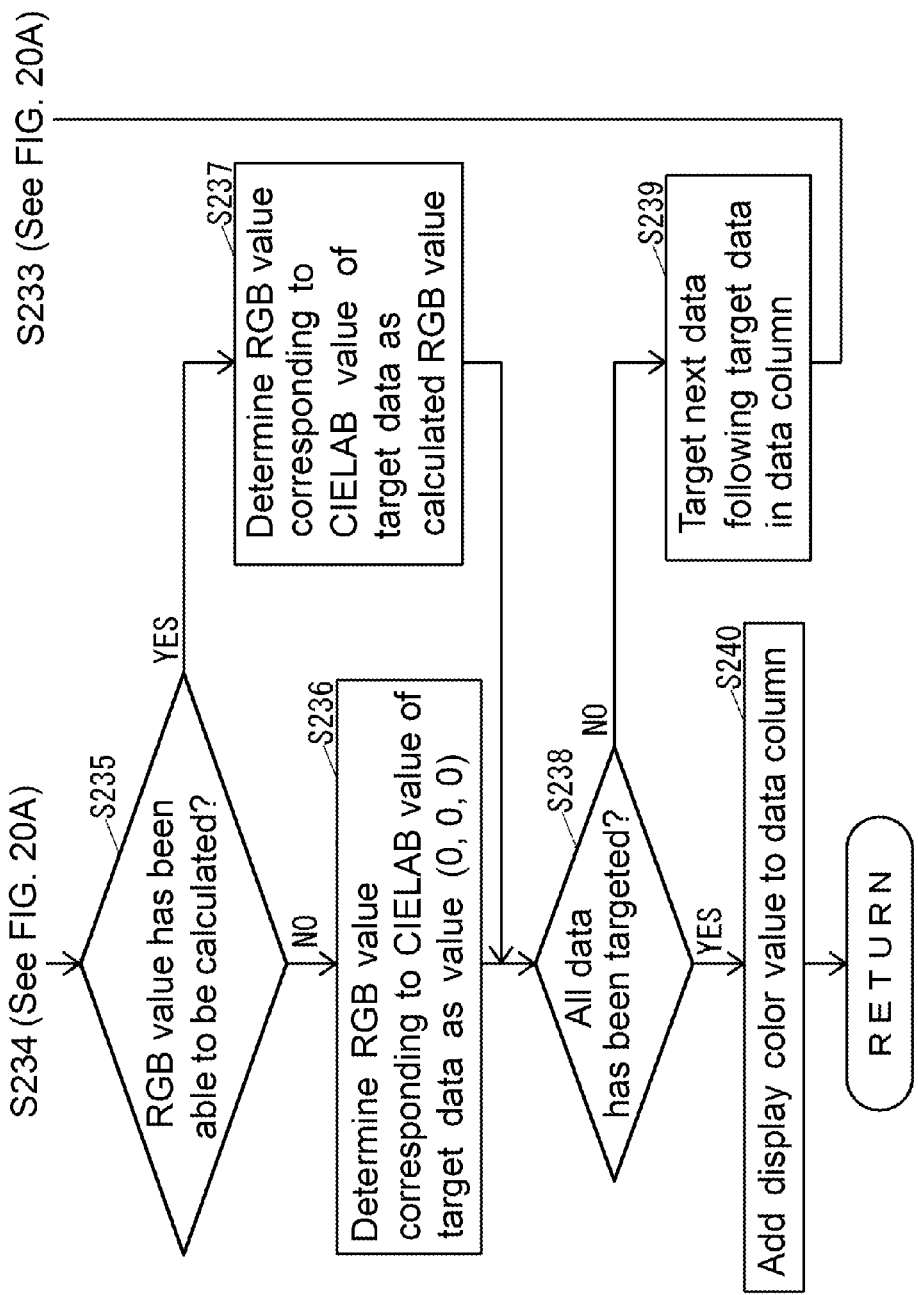

FIGS. 20A and 20B illustrate the display color value conversion process of Step S104.

As illustrated in FIG. 20A, the display color value converting unit 35b acquires the display-device-property information 34c of the display unit 32 (Step S231).

Here, the display color value converting unit 35b may acquire the display-device-property information 34c targeted to be acquired from the storage unit 34 when the display-device-property information 34c targeted to be acquired is stored in the storage unit 34. The display color value converting unit 35b acquires the display-device-property information 34c targeted to be acquired from the display unit 32 when the display-device-property information 34c targeted to be acquired is not stored in the storage unit 34.

Obviously, the display color value converting unit 35b may acquire the display-device-property information 34c at every process of Step S231 from the display unit 32 regardless of whether or not the display-device-property information 34c is stored in the storage unit 34.

After the process of Step S231, the display color value converting unit 35b targets the first data in the data column 60 (Step S232).

Then, the display color value converting unit 35b calculates a hue angle of the target data from a CIELAB value of the target data (Step S233).

Then, the display color value converting unit 35b calculates two adjacent equal hue planes sandwiching a point indicating a CIELAB value of the target data based on the display-device-property information 34c acquired in Step S231, and then calculates a RGB value corresponding to the CIELAB value of the target data using interpolation operation, which is similar to the interpolation operation described in the process of Step S163 (Step S234).

Then, the display color value converting unit 35b determines whether or not a RGB value corresponding to the CIELAB value of the target data has been able to be calculated based on the display-device-property information 34c (Step S235).

Figure 21:
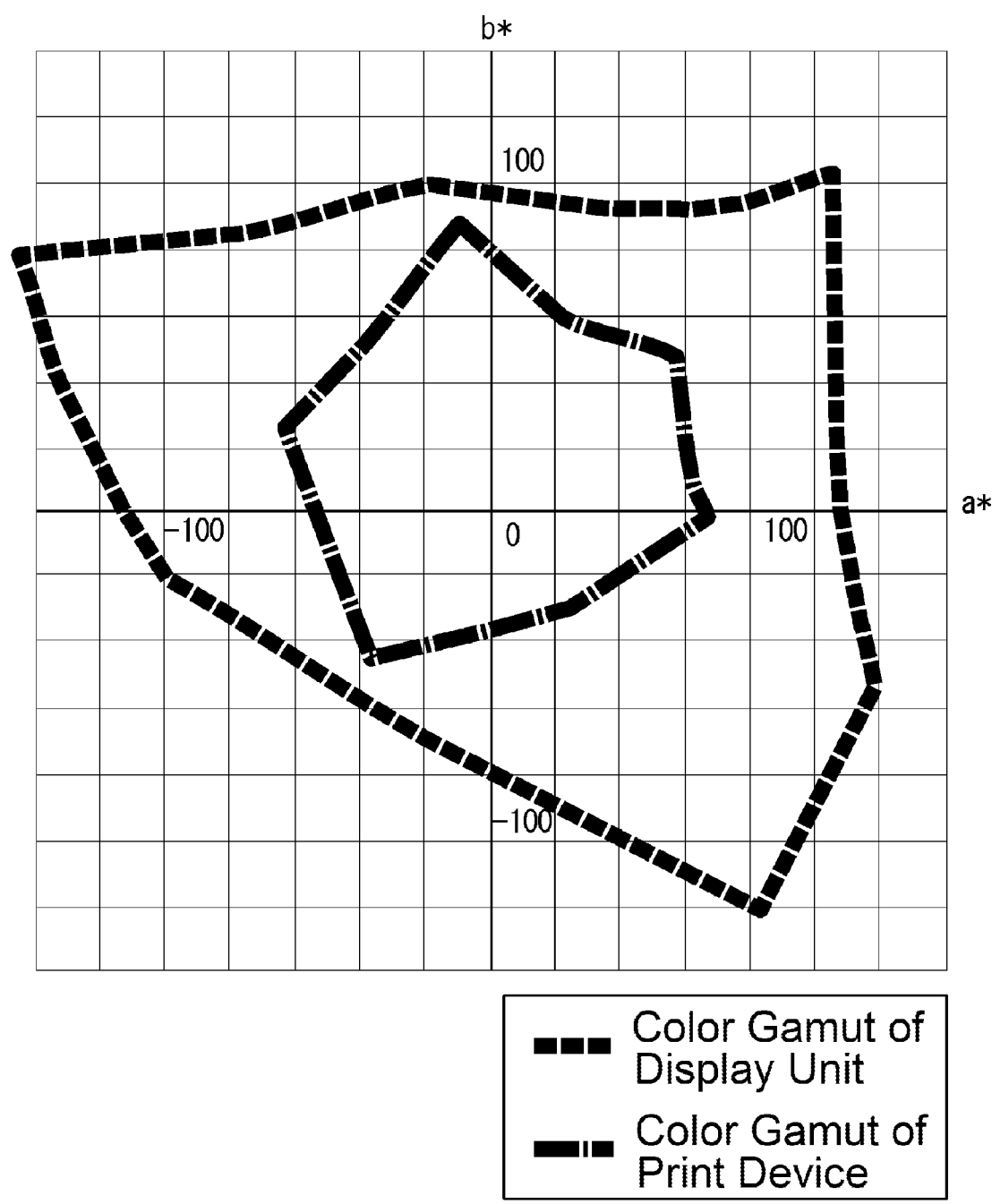
FIG. 21 illustrates one example of a color gamut of the print device according to the one embodiment, and a color gamut of a display unit.
Figure 22:
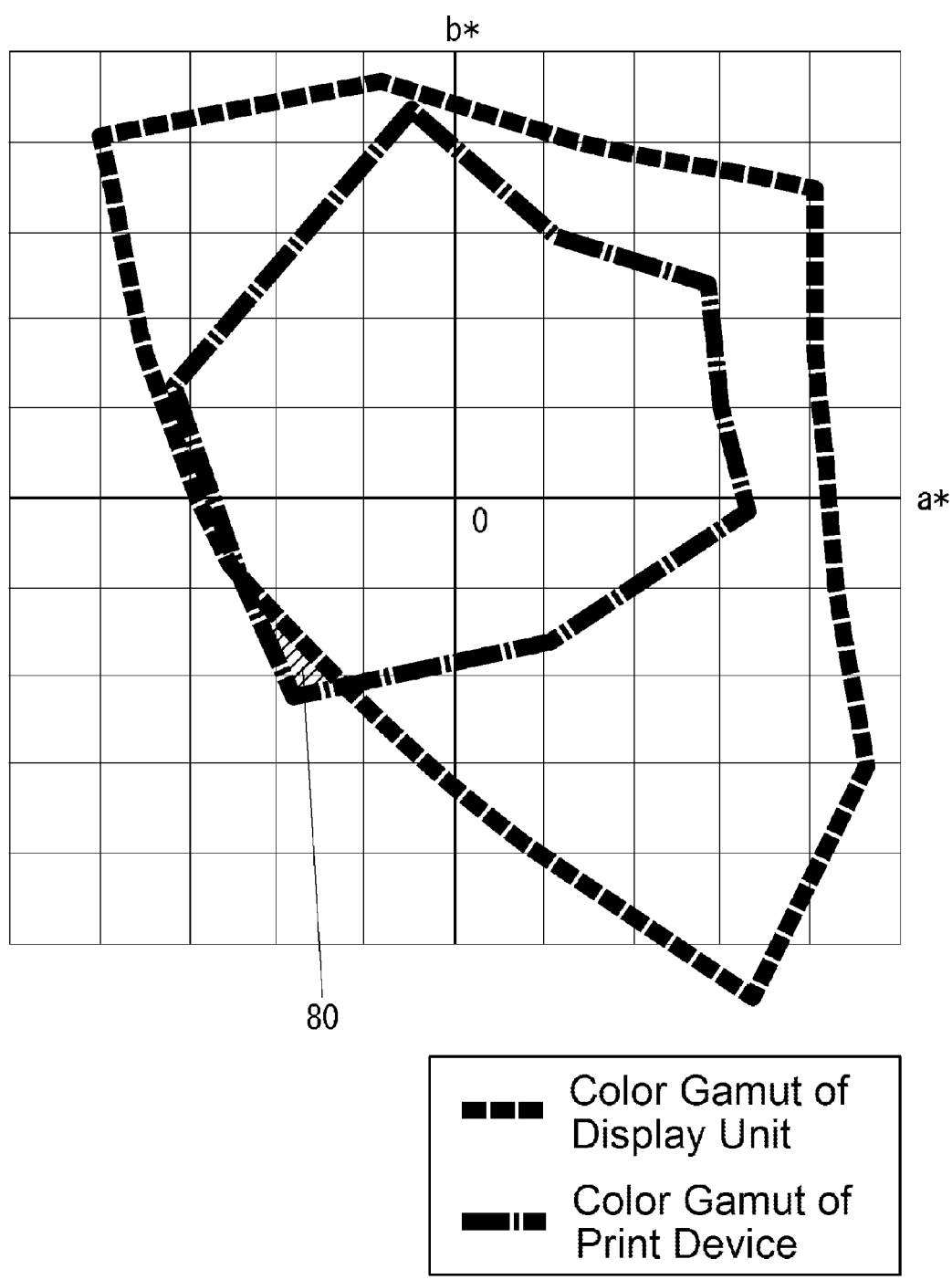
FIG. 22 illustrates another example of a color gamut of the print device and a color gamut of a display unit according to the one embodiment, which is different from the example illustrated in FIG. 21.

FIG. 21 illustrates one example of a color gamut of the print device 20 and a color gamut of the display unit 32. FIG. 22 illustrates another example of a color gamut of the print device 20 and a color gamut of the display unit 32, which is different from the example illustrated in FIG. 21.

FIGS. 21 and 22 illustrate respective properties of the print device 20 and the display unit 32 in the AB plane of the LAB space. For example, the display color value converting unit 35b can calculates RGB values corresponding to all CIELAB values included in the data column 60 if the color gamut of the display unit 32 completely encompasses the color gamut of the print device 20 as illustrated in FIG. 21. The display color value converting unit 35b, however, cannot calculate RGB values corresponding to at least part of CIELAB values among all CIELAB values included in the data column 60 if the color gamut of the display unit 32 fails to completely encompass the color gamut of the print device 20 as illustrated in FIG. 22. In the example illustrated in FIG. 22, the display color value converting unit 35b cannot calculate RGB values as display color values corresponding to CIELAB values in a region 80 of the color gamut of the print device 20, which is not included in the color gamut of the display unit 32, based on the display-device-property information 34c.

The display color value converting unit 35b, which has determined in Step S235 that a RGB value corresponding to a CIELAB value of the target data has not been able to be calculated based on the display-device-property information 34c, namely a CIELAB value of the target data does not exist in the color gamut of the display unit 32, determines a RGB value corresponding to the CIELAB value of the target data as a value (0, 0, 0) or black value (Step S236).

The display color value converting unit 35b, which has determined in Step S235 that a RGB value corresponding to a CIELAB value of the target data has been able to be calculated based on the display-device-property information 34c, namely a CIELAB value of the target data exists in the color gamut of the display unit 32, determines a RGB value corresponding to the CIELAB value of the target data as a RGB value calculated in Step S234 (Step S237).

After the process of Step S236 or Step S237, the display color value converting unit 35b determines whether or not all data in the data column 60 has been targeted (Step S238).

The display color value converting unit 35b, which has determined in Step S238 that data that has not been targeted yet exists in the data column 60, targets the next data following the target data in the data column 60 (Step S239), and then performs the process of Step S233.

The display color value converting unit 35b, which has determined in Step S238 that all the data have been targeted in the data column 60, adds the RGB values as display color values generated in Step S236 or Step S237 to the data column 60 (Step S240), and then terminates the display color value conversion process illustrated in FIGS. 20A and 20B.

Figure 23:
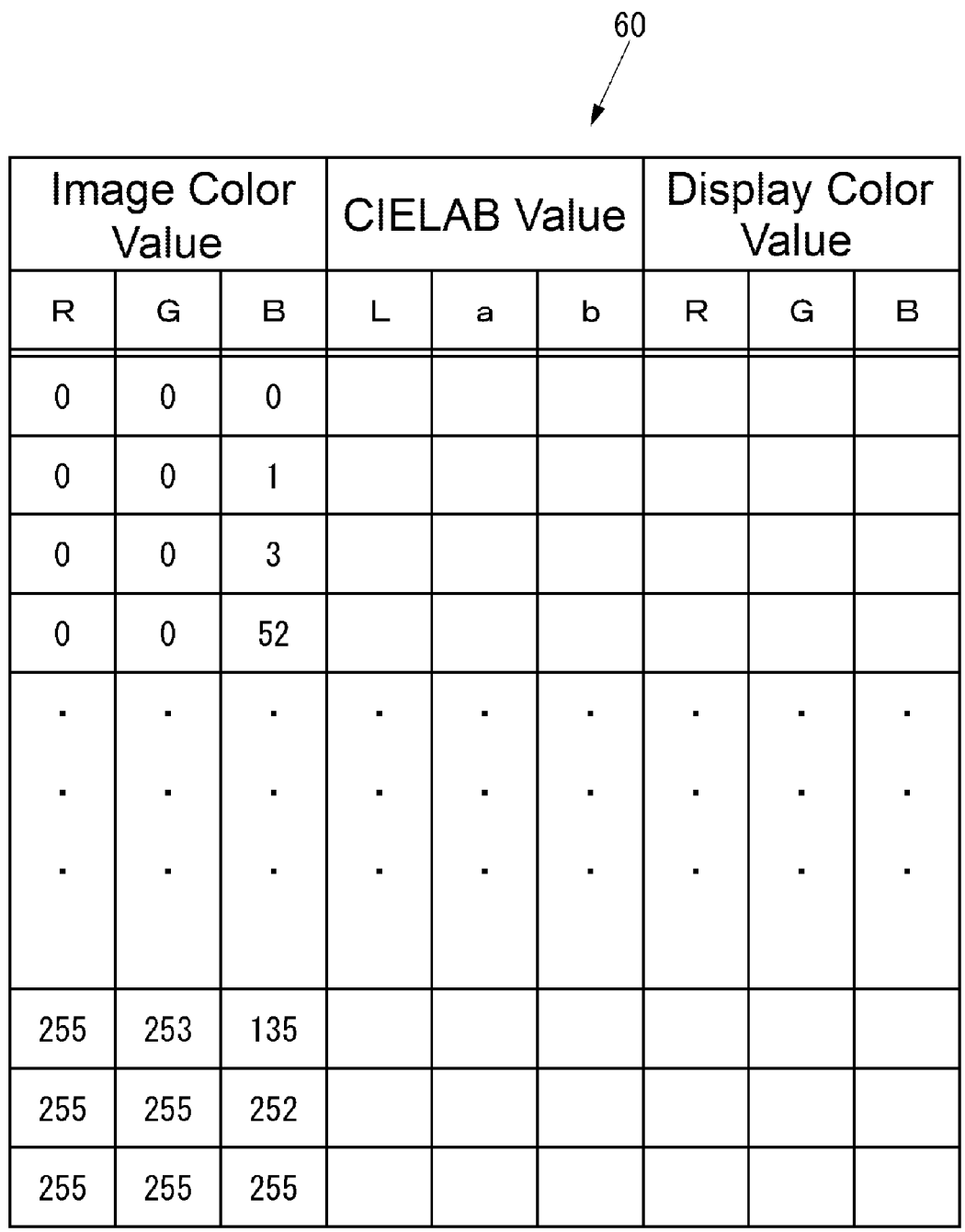
FIG. 23 illustrates the exemplary data column illustrated in FIG. 16, to which display color values is added.

FIG. 23 illustrates the exemplary data column 60 to which display color values are added.

The data column 60 illustrated in FIG. 23 is information for mapping a RGB value as an image color value, to a CIELAB value and to a RGB value as a display color value. Although FIG. 23 illustrates empty fields for L value, a value, and b value of the CIELAB values, and R value, G value, and B value of the display color values, those fields have specific values in practice.

The data column 60 illustrated in FIG. 23 is the data column 60 illustrated in FIG. 16 to which display color values are added. Before the display color value conversion process illustrated in FIGS. 20A and 20B, the display color value converting unit 35b generates, in Step S240, the data column 60 illustrated in FIG. 19 to which display color values are added if the data column 60 is one illustrated in FIG. 19.

As illustrated in FIG. 8, after the display color value conversion process of Step S104, the display color value converting unit 35b performs a displaying image generation process for generating image data displayed by the display unit 32 (Step S105).

Figure 24:
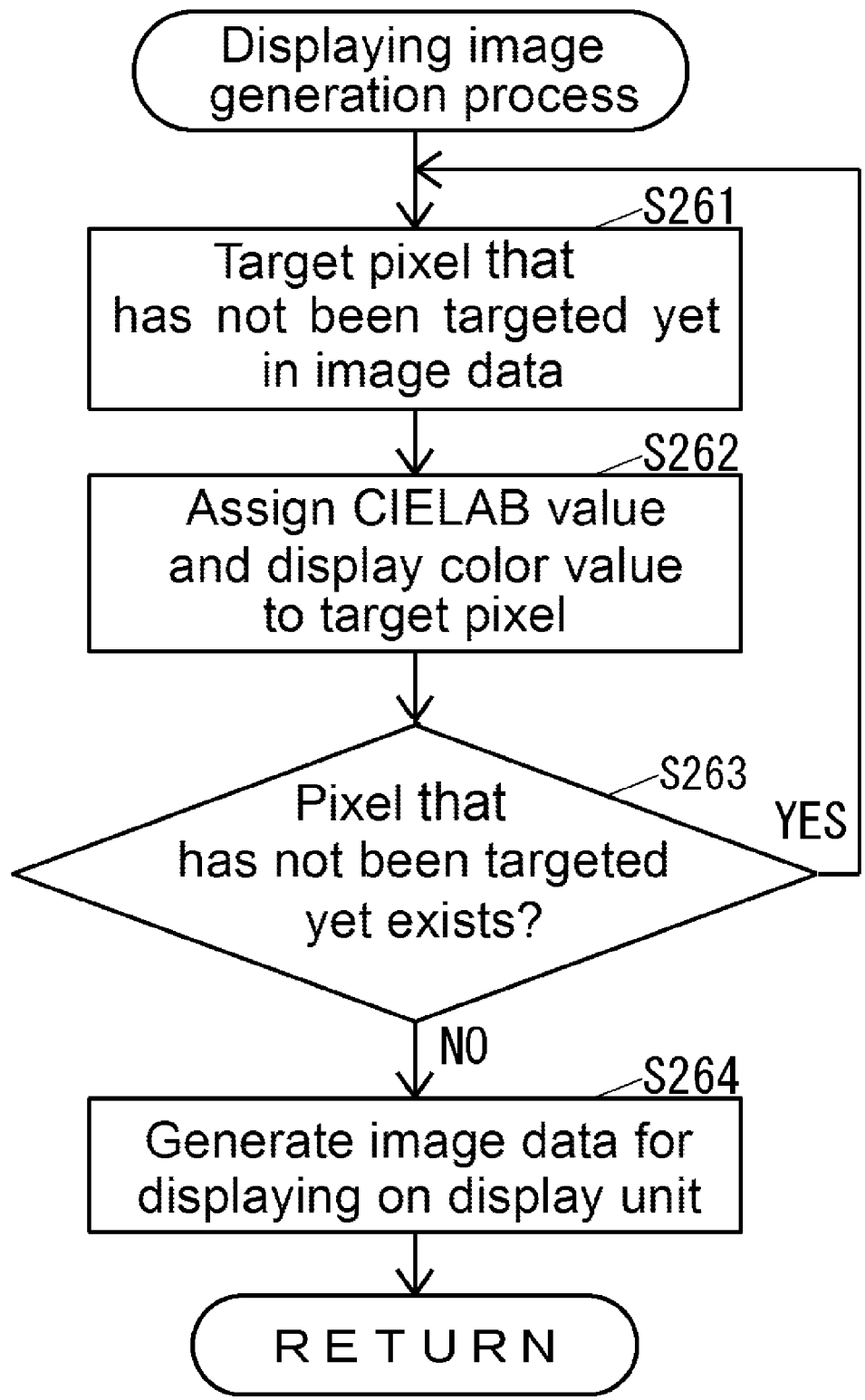
FIG. 24 illustrates the displaying image generation process illustrated in FIG. 8.

FIG. 24 illustrates the displaying image generation process of Step S105.

As illustrated in FIG. 24, the display color value converting unit 35b targets a pixel that has not been targeted yet in the displaying image generation process in the image data acquired in Step S101 (Step S261).

Then, the display color value converting unit 35b assigns a CIELAB value and a display color value, which is mapped to an image color value of the target pixel in the data column 60, to the target pixel (Step S262).

The reason why a CIELAB value is assigned is to enable a user to confirm a CIELAB value of each pixel in the image data by confirming the image data. Confirming a CIELAB value is important especially because all the display color values are set as black value in Step S236 when any CIELAB value does not exist in the color gamut of the display unit 32.

After the process of Step S262, the display color value converting unit 35b determines whether or not a pixel that has not been targeted yet in the displaying image generation process data exists in the image data (Step S263).

The display color value converting unit 35b, which has determined in Step S263 that a pixel that has not been targeted yet in the displaying image generation process exists in the image data, performs the process of Step S261.

The display color value converting unit 35b, which has determined in Step S263 that a pixel which has not been targeted yet in the displaying image generation process does not exist in the image data, converts a color value of the pixel of the image data into a display color value assigned in Step S262 to generate image data, which is displayed by the display unit 32 (Step S264), and then terminates the displaying image generation process illustrated in FIG. 24.

As illustrated in FIG. 8, after the displaying image generation process of Step S105, the control unit 35 causes the display unit 32 to display the image based on the image data generated in Step S264 (Step S106), and then terminates the operation illustrated in FIG. 8.

Figure 25A:
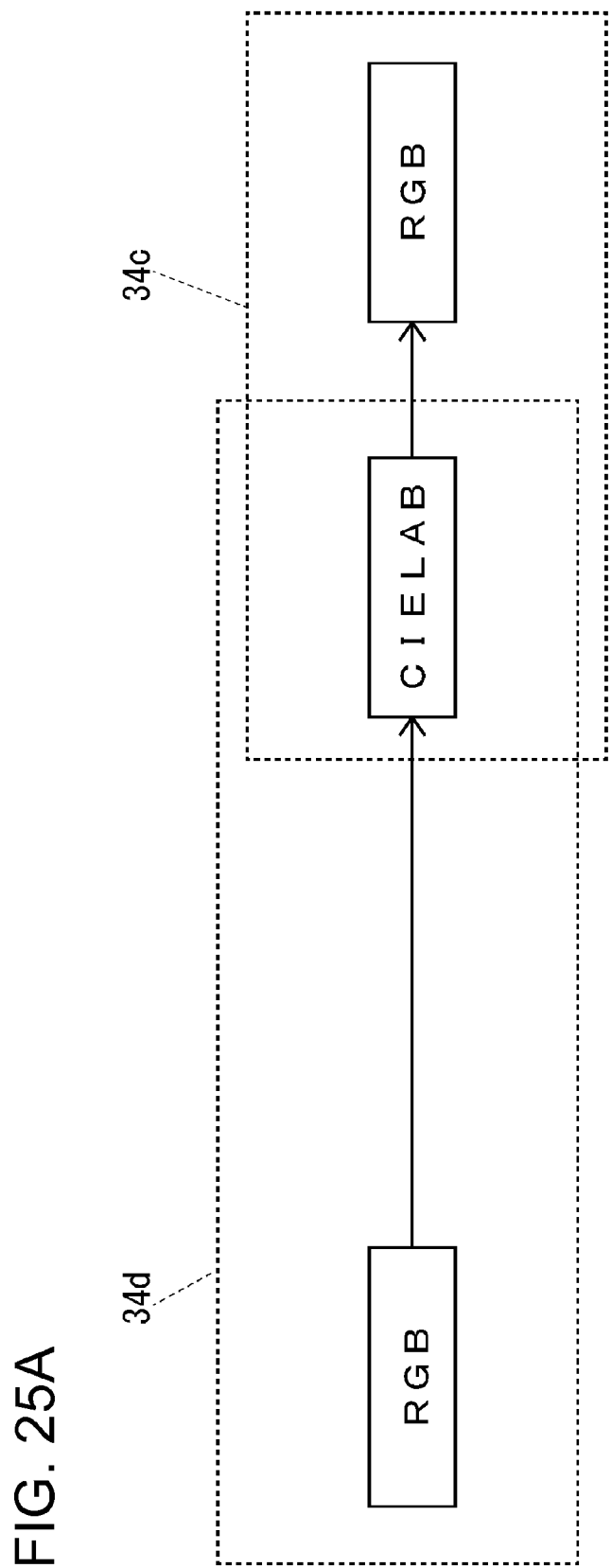
FIG. 25A illustrates a conversion method that converts an image color value into a display color value performed by the computer illustrated in FIG. 2, where the conversion method from an image color value into a print color value is a two phase conversion method.
Figure 25B:
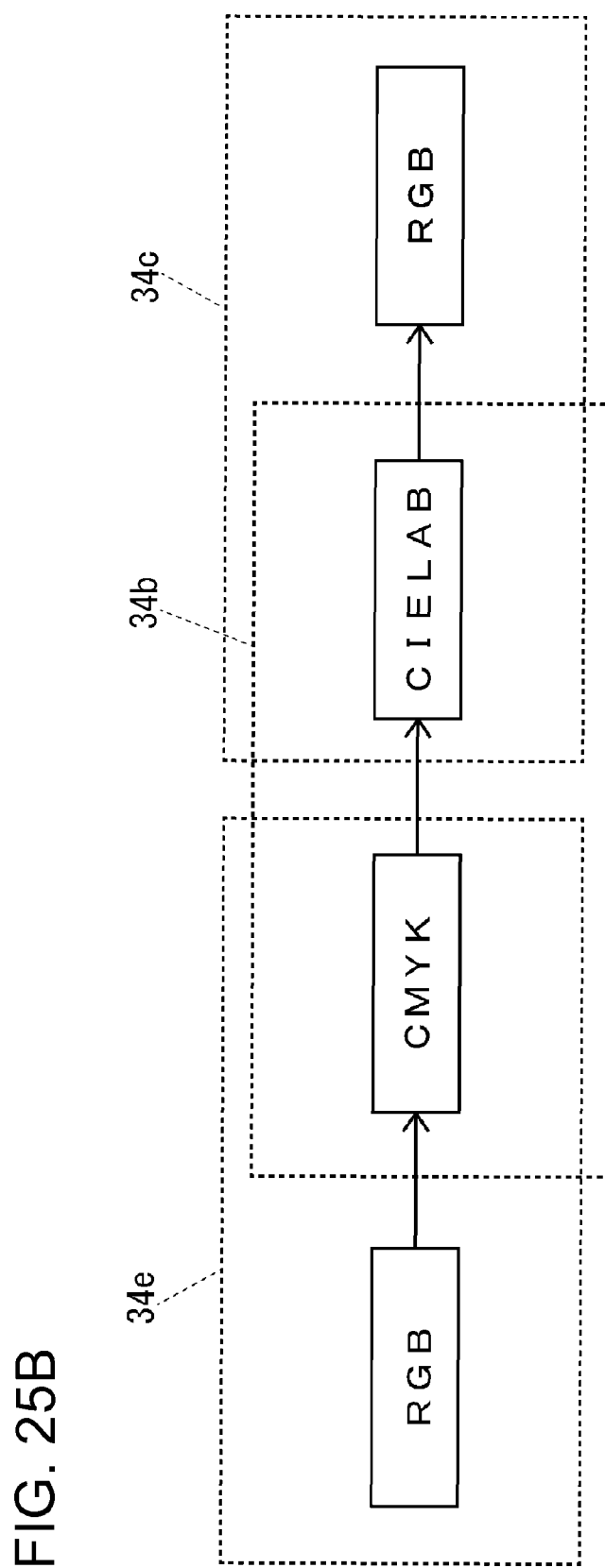
FIG. 25B illustrates a conversion method that converts an image color value into a display color value performed by the computer according to the one embodiment, where the conversion method from an image color value into a print color value is a device link profile method.

As described above, the computer 30 can simulatively represent a print color by the print device 20, as a display color displayed by the display unit 32. Namely, the computer 30 converts a RGB value as an image color value, into an CIELAB value in the print device 20 based on the RGB-to-LAB color conversion table 34d, as illustrated in FIG. 25A, and then converts the CIELAB value into a RGB value as a display color value in the display unit 32, based on the display-device-property information 34c when the conversion method that converts an image color value into a print color value in the print device 20 is the two phase conversion method illustrated in illustrated in FIG. 7A. The computer 30 converts a RGB value as an image color value, into a CMYK value as a print color value, in the print device 20 based on the RGB-to-CMYK color conversion table 34e, as illustrated in FIG. 25B, and then converts the CMYK value into a CIELAB value based on the print-device-property information 34b, and then converts the CIELAB value into a RGB value as a display color value in the display unit 32, based on the display-device-property information 34c when the conversion method that converts an image color value into a print color value in the print device 20 is the device link profile method illustrated in illustrated in FIG. 7B.

The display unit 32 can display images according to the display-device-property information 34c when the calibration (proofing) is surely performed. Then, a preferred update method for the display-device-property information 34c is illustrated in FIG. 26.

Figure 26:
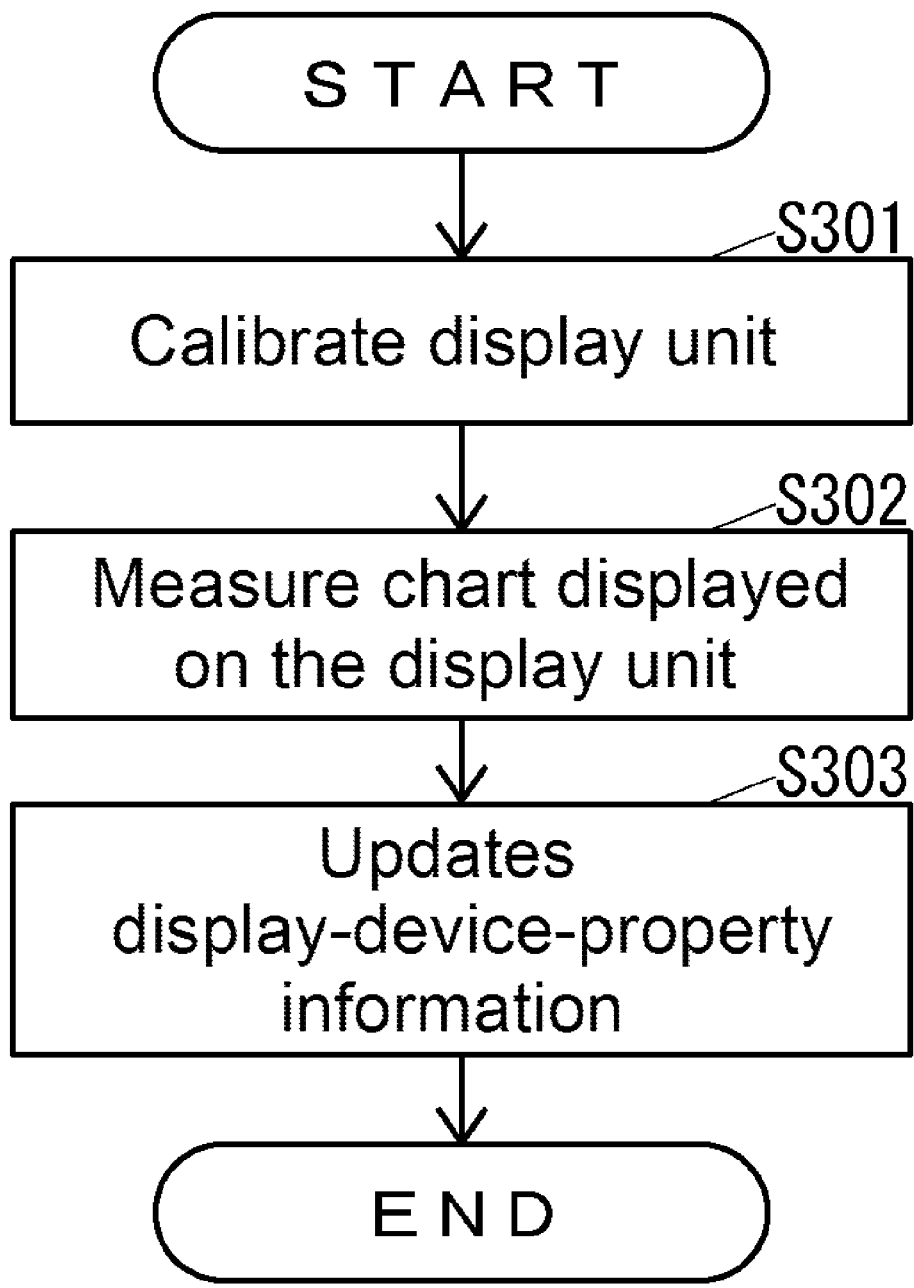
FIG. 26 illustrates a preferred update method of the display-device-property information according to the one embodiment.

As illustrated in FIG. 26, first, a user calibrates the display unit 32 using an application or a tool for calibration (Step S301).

Then, the user mounts a precisely calibrated measuring device to the display unit 32 and then causes the display unit 32 to display a chart for measuring display colors of the display unit 32 to measure colors of the chart displayed on the display unit 32 using the measuring device (Step S302).

Then, the user updates the display-device-property information 34c based on the measurement value in Step S302 (Step S303).

As described above, the computer 30 converts a RGB value as an image color value indicating a color value included in the image data into a CIELAB value (hereinafter referred to as "print color LAB value") indicating a print color by the print device 20, corresponding to a CMYK value as a print color value, converted from the RGB value (Step S103), and then converts the CIELAB value into a RGB value as a display color value, based on the display-device-property information 34c (Step S104 and Step S105). Accordingly the computer 30 can precisely represent a display color by the display unit 32, from a print color by the print device 20 (Step S106).

Accordingly, with the embodiment, a creator of printed matter, such as a designer, can reduce the necessity of the trial and error when the creator adjusts the display color of an image on a display device while confirming it and then causes the print device to print based on the adjusted image. As a result, the embodiment can reduce waste consumption of color material such as toners and recording medium such as paper sheets for generating printed matters and waste of work time of the creator.

The computer 30 can reduce a load for processing when the computer 30 converts a RGB value as an image color value, into a print color LAB value corresponding to the RGB value based on the RGB-to-LAB color conversion table 34d (Step S163) compared with when converting a CMYK value as a print color value, converted from a RGB value as an image color value, based on the RGB-to-CMYK color conversion table 34e (Step S165) into a print color LAB value based on the print-device-property information 34b (Step S168).

The computer 30 can convert a RGB value as an image color value, into a print color LAB value corresponding to the RGB value even without the RGB-to-LAB color conversion table 34d when the computer 30 converts a CMYK value as a print color value, converted from a RGB value as an image color value, based on the RGB-to-CMYK color conversion table 34e (Step S165) into a print color LAB value based on the print-device-property information 34b (Step S168).

If a print color LAB value does not exist in the color gamut of the display unit 32 ("NO" at Step S235), the computer 30 converts the print color LAB value into a display color value other than the closest display color value in the color gamut of the display unit 32 (Step S236), so that a print color that cannot be precisely represented as a display color by the display unit 32 can be eye-catching when it is displayed by the display unit 32. Accordingly, the computer 30 enables the user to clearly recognize a print color that cannot be precisely represented as a display color by the display unit 32.

According to the embodiment, the computer 30 represents, as black, a print color that cannot be precisely represented as a display color by the display unit 32 in display by the display unit 32. The computer 30, however, may represent, as a color other than black, a print color that cannot be precisely represented as a display color by the display unit 32 in display by the display unit 32. For example, the computer 30 may convert a print color LAB value that does not exist in the color gamut of the display unit 32 into a display color value closest to the print color LAB value in the color gamut of the display unit 32.

According to the embodiment, the conversion from a RGB value as an image color value, to a CMYK value as a print color value, is performed by the print device 20. The conversion from an image color value to a print color value, however, may be performed by either one of the print device 20 or the computer 30, or by cooperation of the print device 20 and the computer 30. For example, when a conversion method that converts an image color value into a print color value is the two phase conversion method that converts an image color value into a CIELAB value, and then converts the CIELAB value into a print color value, the conversion from an image color value to a CIELAB value may be performed by the computer 30, then the conversion from the CIELAB value to a print color value may be converted by the print device 20.

According to the embodiment, an image color value, a print color value, a display color value and an independent color value are respectively a RGB value, a CMYK value, a RGB value and a CIELAB value. Other types of color values, however, may be used as a print color value, a display color value and an independent color value. For example, a CMYK value may be used as an image color value.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A color conversion apparatus for simulatively representing colors printed by a print device in accordance with print color values converted from image color values indicating color values included in image data, the color conversion apparatus comprising:
   a liquid crystal display (LCD);
   a communication device for communicating with the print device via a network;
   a hard disk drive (HDD) for storing a color conversion program for representing the colors printed by the print device as colors displayed by the LCD in accordance with display color values; and
   a control unit including a central processing unit (CPU) for executing the color conversion program stored in the HDD; wherein
   the HDD further stores i) print-device-property information, ii) display-device-property information, iii) an RGB-to-LAB color conversion table, and iv) an RGB-to-CMYK color conversion table;
   the print-device-property information i) includes a first color conversion table indicating properties of the print device, ii) indicates a correspondence relationship between CMYK values as the print color values, and CIELAB values corresponding to the CMYK values indicating the colors printed by the print device, the CIELAB values being independent color values independent from the print device's color values and the LCD's color values, and iii) administers four-dimensional CMYK value data by providing three-dimensional CMY value color conversion tables on a per K-content percentage basis;
   the display-device-property information i) includes a second color conversion table indicating properties of the LCD, ii) indicates a correspondence relationship between RGB values as the display color values, and CIELAB values corresponding to the RGB values indicating the LCD's display colors;
   the RGB-to-LAB color conversion table is independent color value conversion information for converting the RGB values as the image color values, into the CIELAB values in a color gamut for the print device;
   the RGB-to-CMYK color conversion table is print-color-value conversion information for the print device, for converting the RGB values as the image color values into the CMYK values as the print color values;
   the CPU is configured for i) converting the image color values into the independent color values indicating the color printed by the print device corresponding to the print color values converted from the image color values, and ii) converting the independent color values into the display color values based on the display-device-property information;
   the CPU performs the conversion from the image color values into the print color values by one of either i) converting the image color values into the independent color values based on the RGB-to-LAB color conversion table as the independent color value conversion information, and then converting the independent color values into the print color values based on the print-device-property information, or ii) converting the image color values into the print color values based on the RGB-to-CMYK color conversion table as the print-color-value conversion information based on the print-device-property information; and the CPU is further configured for converting the independent color values into the value (0, 0, 0) as a black value, if the independent color values are out of the color gamut of the LCD when the independent color values are converted into the display color values based on the display-device-property information.

2. A non-transitory computer-readable recording medium storing a color conversion program for simulatively representing colors printed by a print device in accordance with print color values converted from image color values indicating color values included in image data, using colors displayed by a liquid crystal display (LCD), of a color conversion apparatus, to in accordance with display color values, the color conversion apparatus comprising
the LCD,
a communication device for communicating with the print device via a network,
a hard disk drive (HDD) for storing the color conversion program and further storing i) print-device-property information, ii) display-device-property information, iii) an RGB-to-LAB color conversion table, and iv) an RGB-to-CMYK color conversion table, and
a control unit including a central processing unit (CPU) for executing the color conversion program, wherein
the print-device-property information i) includes a first color conversion table indicating properties of the print device, ii) indicates a correspondence relationship between CMYK values as the print color values, and CIELAB values corresponding to the CMYK values indicating the colors printed by the print device, the CIELAB values being independent color values independent from the print device's color values and the LCD's color values, and iii) administers four-dimensional CMYK value data by providing three-dimensional CMY value color conversion tables on a per K-content percentage basis,
the display-device-property information i) includes a second color conversion table indicating properties of the LCD, ii) indicates a correspondence relationship between RGB values as the display color values, and CIELAB values corresponding to the RGB values indicating the LCD's display colors,
the RGB-to-LAB color conversion table is independent color value conversion information for converting the RGB values as the image color values, into the CIELAB values in a color gamut for the print device,
the RGB-to-CMYK color conversion table is print-color-value conversion information for the print device, for converting the RGB values as the image color values into the CMYK values as the print color values,
the color conversion program causing the CPU of the color conversion apparatus to:
i) the image color values into the independent color values indicating the color printed by the print device corresponding to the print color values converted from the image color values; and
ii) convert the independent color values into the display color values based on the display-device-property information; wherein
the CPU performs the conversion from the image color values into the print color values by one of either i) converting the image color values into the independent color values based on the RGB-to-LAB color conversion table as the independent color value conversion information, and then converting the independent color values into the print color values based on the print-device-property information, or ii) converting the image color values into the print color values based on the RGB-to-CMYK color conversion table as the print-color-value conversion information based on the print-device-property information; and
the color conversion program further causes the CPU of the color conversion apparatus to convert the independent color values into the value (0, 0, 0) as a black value, if the independent color values are out of the color gamut of the LCD when the independent color values are converted into the display color values based on the display-device-property information.

3. A color conversion method for simulatively representing colors printed by a print device in accordance with print color values converted from image color values indicating color values included in image data, using colors displayed by a liquid crystal display (LCD), of a color conversion apparatus, in accordance with display color values, the color conversion apparatus comprising
the LCD,
a communication device for communicating with the print device via a network,
a hard disk drive (HDD) for a color conversion program for representing colors printed by print device as colors displayed by the LCD in accordance with display color values, the HDD further storing i) print-device-property information, ii) display-device-property information, iii) an RGB-to-LAB color conversion table, and iv) an RGB-to-CMYK color conversion table, and
a control unit including a central processing unit (CPU) for executing the color conversion program stored in the HDD, wherein
the print-device-property information i) includes a first color conversion table indicating properties of the print device, ii) indicates a correspondence relationship between CMYK values as the print color values, and CIELAB values corresponding to the CMYK values indicating the colors printed by the print device, the CIELAB values being independent color values independent from the print device's color values and the LCD's color values, and iii) administers four-dimensional CMYK value data by providing three-dimensional CMY value color conversion tables on a per K-content percentage basis,
the display-device-property information i) includes a second color conversion table indicating properties of the LCD, ii) indicates a correspondence relationship between RGB values as the display color values, and CIELAB values corresponding to the RGB values indicating the LCD's display colors,
the RGB-to-LAB color conversion table is independent color value conversion information for converting the RGB values as the image color values, into the CIELAB values in a color gamut for the print device, and
the RGB-to-CMYK color conversion table is print-color-value conversion information for the print device, for converting the RGB values as the image color values into the CMYK values as the print color values,
the color conversion method comprising:
converting the image color values into the independent color values indicating the color printed by the print device corresponding to the print color values converted from the image color values; and converting the independent color values into the display color values based on the display-device-property information, and if the independent color values are out of the color gamut of the LCD converting the independent color values into the value (0, 0, 0) as a black value; wherein the conversion from the image color values into the print color values is performed by one of either i) converting the image color values into the independent color values based on the RGB-to-LAB color conversion table as the independent color value conversion information, and then converting the independent color values into the print color values based on the print-device-property information, or ii) converting the image color values into the print color values based on the RGB-to-CMYK color conversion table as the print-color-value conversion information based on the print-device-property information.

* * * * *